(12) United States Patent
Flynn et al.

(10) Patent No.: US 12,335,521 B2
(45) Date of Patent: Jun. 17, 2025

(54) IN-TREE GEOMETRY QUANTIZATION OF POINT CLOUDS

(71) Applicant: APPLE INC., Cupertino, CA (US)

(72) Inventors: David Flynn, Cupertino, CA (US); Khaled Mammou, Cupertino, CA (US); Fabrice A. Robinet, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 155 days.

(21) Appl. No.: 17/791,635

(22) PCT Filed: Jan. 8, 2021

(86) PCT No.: PCT/US2021/012828
§ 371 (c)(1),
(2) Date: Jul. 8, 2022

(87) PCT Pub. No.: WO2021/142362
PCT Pub. Date: Jul. 15, 2021

(65) Prior Publication Data
US 2023/0046917 A1 Feb. 16, 2023

Related U.S. Application Data

(60) Provisional application No. 62/959,832, filed on Jan. 10, 2020, provisional application No. 62/959,105, filed on Jan. 9, 2020.

(51) Int. Cl.
*H04N 19/597* (2014.01)
*G06T 15/00* (2011.01)
(Continued)

(52) U.S. Cl.
CPC ........... *H04N 19/597* (2014.11); *G06T 15/00* (2013.01); *H04N 19/124* (2014.11);
(Continued)

(58) Field of Classification Search
CPC .. H04N 19/597; H04N 19/124; H04N 19/167; H04N 19/182; H04N 19/96;
(Continued)

(56) References Cited

U.S. PATENT DOCUMENTS

| 11,869,223 B2 | 1/2024 | Flynn et al. |
| 2017/0324643 A1 | 11/2017 | Seregin et al. |

(Continued)

FOREIGN PATENT DOCUMENTS

| CA | 3090465 | 8/2019 | |
| CA | 3090465 A1 * | 8/2019 | ............. G06T 9/001 |

(Continued)

OTHER PUBLICATIONS

Zhang et al. ("[G-PCC] EE13.6 report on geometry quantization", ISO/IEC JTC1/SC29/WG11 MPEG2019/m50924, Oct. 2019). A copy has been attached by Applicant on Oct. 21, 2022. (Year: 2019).*

(Continued)

*Primary Examiner* — Matthew K Kwan
(74) *Attorney, Agent, or Firm* — Fish & Richardson P.C.

(57) ABSTRACT

An example device includes one or more processors, and memory storing instructions that when executed by the processors, cause the processors to receive points that represent a point cloud in three-dimensional space, and generate a data structure representing the point cloud. Generating the data structure includes encoding a position of each point in each dimension as a sequence of bits according to a tree data structure; partitioning each of the sequences into two or more portions according to a scaling depth; determining that a subset of the points is spatially isolated from a remainder of the points; quantizing each of the portions associated with the subset of the points according to a first quantization step size; quantizing each of the portions associated with the (Continued)

remainder of the points according to a second quantization step size; and including the quantized portions in the data structure.

12 Claims, 18 Drawing Sheets

(51) Int. Cl.
  *H04N 19/124* (2014.01)
  *H04N 19/167* (2014.01)
  *H04N 19/182* (2014.01)
  *H04N 19/96* (2014.01)

(52) U.S. Cl.
  CPC ......... *H04N 19/167* (2014.11); *H04N 19/182* (2014.11); *H04N 19/96* (2014.11)

(58) Field of Classification Search
  CPC ....... H04N 19/119; G06T 15/00; G06T 9/001; G06T 9/40
  USPC .................................................. 375/240.03
  See application file for complete search history.

(56) References Cited

U.S. PATENT DOCUMENTS

| | | | |
|---|---|---|---|
| 2018/0286107 A1 | 10/2018 | Hemmer et al. | |
| 2019/0080483 A1 | 3/2019 | Mammou et al. | |
| 2019/0095548 A1 | 3/2019 | Ioannatos et al. | |
| 2019/0323919 A1 | 10/2019 | Fung-A Wing et al. | |
| 2019/0325614 A1* | 10/2019 | Melkote Krishnaprasad | H04N 19/119 |
| 2020/0366941 A1* | 11/2020 | Sugio | H04N 19/96 |
| 2023/0053544 A1 | 2/2023 | Flynn et al. | |
| 2024/0119641 A1 | 4/2024 | Flynn et al. | |

FOREIGN PATENT DOCUMENTS

| | | |
|---|---|---|
| CN | 1790421 | 6/2006 |
| CN | 106846425 | 6/2017 |
| CN | 108335335 | 7/2018 |
| EP | 3553746 | 10/2019 |
| WO | WO 2018182184 | 10/2018 |

OTHER PUBLICATIONS

3DG, "G-PCC codec description v4", ISO/IEC JTC1/SC29/WG11 N18673, Jul. 2019. Also cited on Applicant's IDS dated Oct. 21, 22 with copy provided by Applicant on the same date. (Year: 2019).*
[No Author Listed], "G-PCC Codec Description v4," ISO/IEC JTC1/SC29/WG11 N18673, Gothenburg, SE, Jul. 2019, 62 pages.
Flynn et al., "G-PCC CE13.29 report on in-tree geometry quantization," ISO/IEC JCTC1/SC29/WG11 MPEP/m53389, Online, Apr. 2020, 9 pages.
Flynn et al., "G-PCC: An IDCM specific QP for in-tree geometry quantization," ISO/IEC JCTC1/SC29/WG11 MPEG/m52523, Brussels, Belgium, Jan. 2020, 3 pages.
Flynn et al., "G-PCC: Geometry octree QP constraints, " ISO/IEC JCTC1/SC29/WG11 MPEG/m53682, Online, Apr. 2020, 2 pages.
Flynn et al., "G-PCC: Integer step sizes for in-tree geometry quantization," ISO/IEC JTC1/SC29/WG11 MPEG2019/m52522, Brussels, Belgium, Jan. 2020, 4 pages.
International Preliminary Report on Patentability in International Appln. No. PCT/US2021/012827, mailed Jul. 21, 2022, 10 pages.
International Preliminary Report on Patentability in International Appln. No. PCT/US2021/012828, mailed Jul. 21, 2022, 9 pages.
International Search Report and Written Opinion in International Appln. No. PCT/US2021/012827, mailed Apr. 26, 2021, 18 pages.
International Search Report and Written Opinion in International Appln. No. PCT/US2021/012828, mailed Apr. 8, 2021, 17 pages.
Liu et al., "A Comprehensive Study and Comparison of Core Technologies for MPEG 3D Point Cloud Compression," IEEE Transactions on Broadcasting, Dec. 20, 2019, 17 pages.
Zhang et al., "[G-PCC] EE13.6 report on geometry quantization," ISO/IEC JTC1/SC29/WG11 MPEG2019/m50924, Geneva, Switzerland, Oct. 2019, 12 pages.
Zhang et al., "[G-PCC][New proposal] Signaling delta QPs for adaptive geometry quantization in point cloud coding," ISO/IEC JTC1/SC29/WG11 MPEG2019/m49232, Gothenburg, Sweden, Jul. 2019, 10 pages.
Yuan et al., "Three-dimensional Point Cloud Compression Algorithm Based on Improved Octree," Acta Optica Sinica, Dec. 2017, 37(12):1210003-1-1210003-9 (with English Abstract).

* cited by examiner

IN-TREE GEOMETRY QUANTIZATION OF POINT CLOUDS

CROSS-REFERENCE TO RELATED APPLICATION

This application claims priority under 35 U.S.C. 371 to International Application No. PCT/US2021/012828, filed on Jan. 8, 2021, which claims priority from U.S. Provisional Application Ser. No. 62/959,105, filed on Jan. 9, 2020, and U.S. Provisional Application Ser. No. 62/959,832, filed on Jan. 10, 2020, which are incorporated herein by reference in their entirety.

TECHNICAL FIELD

This disclosure relates generally to storing and processing information regarding point clouds that include a plurality of points.

BACKGROUND

Various types of sensors, such as light detection and ranging (LIDAR) systems, 3-D-cameras, 3-D scanners, etc. may capture data indicating positions of points in three dimensional space, for example positions in the X, Y, and Z planes. Also, such systems may further capture attribute information in addition to spatial information for the respective points, such as color information (e.g., RGB values), intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" including a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time consuming to store and transmit.

SUMMARY

In an example, a method includes receiving by a computer system, a plurality of points that represent a point cloud in three-dimensional space; and generating, by the computer system, a data structure representing the point cloud in the three-dimensional space. Generating the data structure includes representing, for each point, a position of the point in each dimension of the three-dimensional space as a sequence of bits, where the position of the point is represented according to a tree data structure; partitioning each of the sequences of bits into a first portion of bits and a second portion of bits according to a scaling depth of the tree data structure; determining that a subset of the points is spatially isolated from a remainder of the points; quantizing each of the second portions of bits associated with the subset of the points according to a first quantization step size; quantizing each of the second portions of bits associated with the remainder of the points according to a second quantization step size, where the first quantization step size is different from the second quantization step size; including the quantized second portions of bits in the data structure; and at least one of transmitting or storing the data structure by the computer system.

Implementations of this aspect can include one or more of the following features.

In some implementations, generating the data structure can include including a header in the data structure indicating the first quantization step size.

In some implementations, determining that the subset of the points is spatially isolated from the remainder of the points can include determining that the subset of the points is spatially isolated from the remainder of the points at a first depth of the tree data structure, where the first depth is less than or equal to the scaling depth. Each of the second portions of bits associated with the subset of the points can be quantized according to the first quantization step size responsive to the determination.

In some implementations, determining that the subset of the points is spatially isolated from the remainder of the points at the first depth can include determining that, at the first depth, the subset of the points occupies one or more first nodes of the tree data structure, and determining that, at the first depth, the remaining of the points occupies one or more second nodes of the tree data structure, where the one or more first nodes are not adjacent to any of the one or more second nodes.

In some implementations, the tree data structure can be an octree.

In some implementations, the tree data structure can include a plurality of nodes arranged according to a plurality of tree levels. Further, a first node of the plurality of nodes can expressly signal the position of one of more of the points of the point cloud. The quantization parameter and/or the quantization step size can be constrained according a tree level of the first node from among the plurality of tree nodes of the tree data structure.

In another aspect, a method includes receiving, by a computer system, a data structure representing a point cloud in three-dimensional space, the point cloud having a plurality of points. The data structure includes, for each point, a sequence of bits encoding a position of the point in each dimension of the three-dimensional space, where the position of the point is encoded according to a tree data structure. For a subset of the points, the corresponding sequences of bits are quantized according to a first quantization step size. For a remainder of the points, the corresponding sequences of bits are quantized according to a second quantization step size, where the first quantization step size is different from the second quantization step size. The subset of the points are spatially isolated from a remainder of the points. The method also includes determining, by the computer system, the position of each of the points based on the data structure; and outputting, by the computer system, the determined positions of each of the points.

Implementations of this aspect can include one or more of the following features.

In some implementations, determining the position of each of the points based on the data structure can include retrieving an indication of the first quantization step size from a header in the data structure, and determining the position of each of the points of the subset of points based on the first quantization step size.

In some implementations, the tree data structure can be an octree.

In some implementations, the method can include rendering three-dimensional content based on the determined positions of each of the points. The three-dimensional content can be at least one of virtual reality content or augmented reality content.

In another aspect, a method includes receiving, by a computer system, a plurality of points that represent a point cloud in three-dimensional space; and generating, by the computer system, a data structure representing the point cloud in the three-dimensional space. Generating the data structure includes representing, for each point, a position of the point in each dimension of the three-dimensional space as a sequence of bits, where the position of the point is represented according to a tree data structure. The tree data structure includes a plurality of tree levels, each having a plurality of nodes. Each node of a first tree level has a first number of corresponding child nodes in a second tree level, and each node of the second tree level has a second number of corresponding child nodes in a third tree level, where the first number is different from the second number. Generating the data structure also includes including, in the data structure, a first set of parameters indicating the first number and the first tree level, and a second set of parameters indicating the second number and the second tree level.

Implementations of this aspect can include one or more of the following features.

In some implementations, the first number is a cube of an integer, and the second number is not a cube of an integer.

In some implementations, the method can further include determining, each of the nodes of the third tree level, an occupancy of adjacent nodes of the third tree level; performing, each of the nodes, one or more data processing steps based on the determined occupancy of the adjacent nodes of the third tree level; and subsequent to performing the one or more data processing steps, performing one or more quantization or scaling steps with respect to the data structure.

In some implementations, performing the one or more quantization or scaling steps with respect to the data structure can include partitioning each of the sequences of bits into two or more portions of bits according to a scaling depth of the tree data structure.

In some implementations, performing one or more quantization or scaling steps with respect to the data structure further can include quantizing at least some of the portions of bits according to a quantization step size; and including the quantized sequences of bits in the data structure.

In another aspect, a method includes receiving, by a computer system, a data structure representing a point cloud in three-dimensional space, the point cloud having a plurality of points. The data structure indicates, for each of the points, a position of a point encoded according to a tree data structure. The tree data structure includes a plurality of tree levels, each having a plurality of nodes. Each node of a first tree level has a first number of corresponding child nodes in a second tree level, and each node of the second tree level has a second number of corresponding child nodes in a third tree level, where the first number is different from the second number. The data structure includes a first set of parameters indicating the first number and the first tree level, and a second set of parameters indicating the second number and the second tree level. The method also includes determining, by the computer system, the position of each of the points based on the data structure; and outputting, by the computer system, the determined positions of each of the points.

Implementations of this aspect can include one or more of the following features.

In some implementations, the first number is a cube of an integer, and the second number is not a cube of an integer.

In some implementations, determining the position of each of the points based on the data structure can include retrieving, from the data structure, the first set of parameters and the second set of parameters; and determining, based on the first set of parameters and the second set of parameters, that each node of the first tree level has the first number of corresponding child nodes in the second tree level, and that each node of the second tree level has the second number of corresponding child nodes in the third tree level.

In some implementations, the tree data structure can be an octree.

In some implementations, the method can include rendering three-dimensional content based on the determined positions of each of the points. The three-dimensional content can be at least one of virtual reality content or augmented reality content.

Other implementations are directed to systems, devices, and non-transitory, computer-readable media having instructions stored thereon, that when executed by one or more processors, cause the one or more processors to perform operations described herein.

The details of one or more embodiments are set forth in the accompanying drawings and the description below. Other features and advantages will be apparent from the description and drawings, and from the claims.

Figure 1:
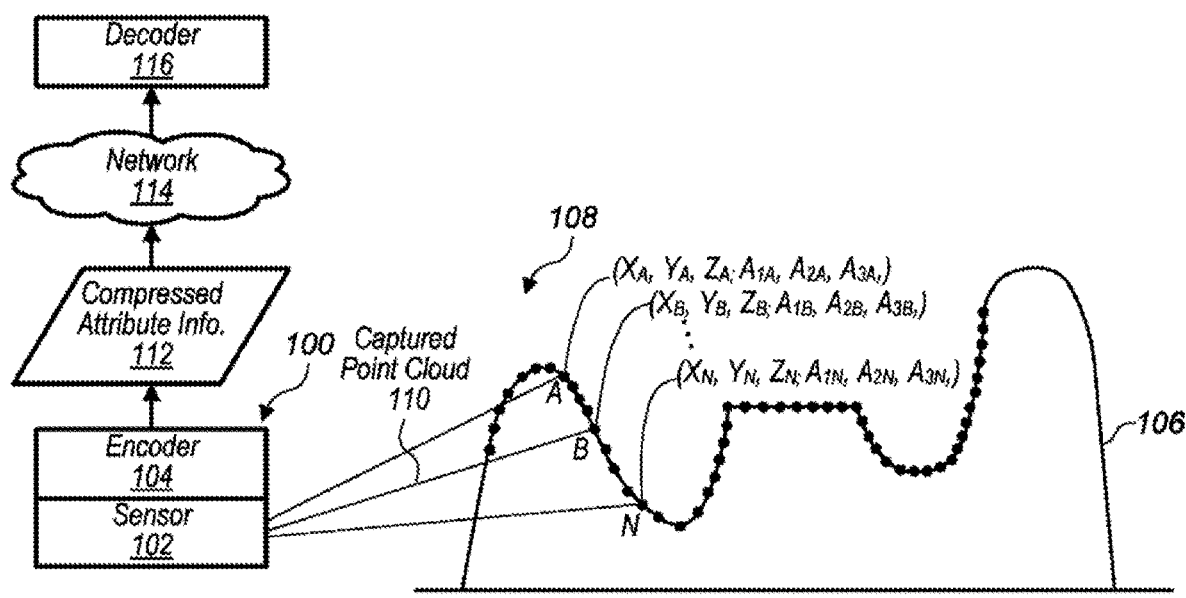
FIG. 1 illustrates a system including a sensor that captures information for points of a point cloud and an encoder that compresses attribute and/or spatial information of the point cloud, where the compressed attribute and/or spatial information is sent to a decoder.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be\ described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture point clouds including thousands or millions of points in 2-D or 3-D space, such as via LIDAR systems, has increased. Also, the development of advanced display technologies, such as virtual reality or augmented reality systems, has increased potential uses for point clouds. However, point cloud files are often very large and may be costly and time-consuming to store and transmit. For example, communication of point clouds over private or public networks, such as the Internet, may require considerable amounts of time and/or network resources, such that some uses of point cloud data, such as real-time uses, may be limited. Also, storage requirements of point cloud files may consume a significant amount of storage capacity of devices storing the point cloud files, which may also limit potential applications for using point cloud data.

In some embodiments, an encoder may be used to generate a compressed point cloud to reduce costs and time associated with storing and transmitting large point cloud files. In some embodiments, a system may include an encoder that compresses attribute or spatial information of a point cloud file such that the point cloud file may be stored and transmitted more quickly than non-compressed point clouds and in a manner that the point cloud file may occupy less storage space than non-compressed point clouds. In some embodiments, compression of attributes of points in a point cloud may enable a point cloud to be communicated over a network in real-time or in near real-time. For example, a system may include a sensor that captures attribute information about points in an environment where the sensor is located, where the captured points and corresponding attributes make up a point cloud. The system may also include an encoder that compresses the captured point cloud attribute information. The compressed attribute information of the point cloud may be sent over a network in real-time or near real-time to a decoder that decompresses the compressed attribute information of the point cloud. The decompressed point cloud may be further processed, for example to make a control decision based on the surrounding environment at the location of the sensor. The control decision may then be communicated back to a device at or near the location of the sensor, where the device receiving the control decision implements the control decision in real-time or near real-time. In some embodiments, the decoder may be associated with an augmented reality system and the decompressed attribute information may be displayed or otherwise used by the augmented reality system. In some embodiments, compressed attribute information for a point cloud may be sent with compressed spatial information for points of the point cloud. In other embodiments, spatial information and attribute information may be separately encoded and/or separately transmitted to a decoder.

In some embodiments, a system may include a decoder that receives one or more point cloud files including compressed attribute information via a network from a remote server or other storage device that stores the one or more point cloud files. For example, a 3-D display, a holographic display, or a head-mounted display may be manipulated in real-time or near real-time to show different portions of a virtual world represented by point clouds. In order to update the 3-D display, the holographic display, or the head-mounted display, a system associated with the decoder may request point cloud files from the remote server based on user manipulations of the displays, and the point cloud files may be transmitted from the remote server to the decoder and decoded by the decoder in real-time or near real-time. The displays may then be updated with updated point cloud data responsive to the user manipulations, such as updated point attributes.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in a point cloud. For example, in some embodiments, a gyroscope or accelerometer, may capture motion information to be included in a point cloud as an attribute associated with one or more points of the point cloud. For example, a vehicle equipped with a LIDAR system, a 3-D camera, or a 3-D scanner may include the vehicle's direction and speed in a point cloud captured by the LIDAR system, the 3-D camera, or the 3-D scanner. For example, when points in a view of the vehicle are captured they may be included in a point cloud, where the point cloud includes the captured points and associated motion information corresponding to a state of the vehicle when the points were captured.

FIG. 1 illustrates a system including a sensor that captures information for points of a point cloud and an encoder that compresses attribute information of the point cloud, where the compressed attribute information is sent to a decoder.

System 100 includes sensor 102 and encoder 104. Sensor 102 captures a point cloud 110 including points representing structure 106 in view 108 of sensor 102. For example, in some embodiments, structure 106 may be a mountain range, a building, a sign, an environment surrounding a street, or any other type of structure. In some embodiments, a captured point cloud, such as captured point cloud 110, may include spatial and attribute information for the points included in the point cloud. For example, point A of captured point cloud 110 including X, Y, Z coordinates and attributes 1, 2, and 3. In some embodiments, attributes of a point may include attributes such as R, G, B color values, a velocity at the point, an acceleration at the point, a reflectance of the structure at the point, a time stamp indicating when the point was captured, a string-value indicating a modality when the point was captured, for example "walking", or other attributes. The captured point cloud 110 may be provided to encoder 104, where encoder 104 generates a compressed version of the point cloud (compressed attribute information 112) that is transmitted via network 114 to decoder 116. In some embodiments, a compressed version of the point cloud, such as compressed attribute information 112, may be included in a common compressed point cloud that also includes compressed spatial information for the points of the point cloud or, in some embodiments, compressed spatial information and compressed attribute information may be communicated as separate files.

In some embodiments, encoder 104 may be integrated with sensor 102. For example, encoder 104 may be implemented in hardware or software included in a sensor device, such as sensor 102. In other embodiments, encoder 104 may be implemented on a separate computing device that is proximate to sensor 102.

In some circumstances, the number of bits needed to encode attribute information includes a significant portion of bit stream for a point cloud.

In some embodiments, the position of points in the point cloud 110 can be encoded according to a tree data structure. For instance, a three-dimensional space can be recursively subdivided into successively smaller portions. Each of these portions can be represented by a respective node in a tree data structure. The presence of a point in each portion can be indicated in the corresponding node of the tree data structure.

Figure 2:
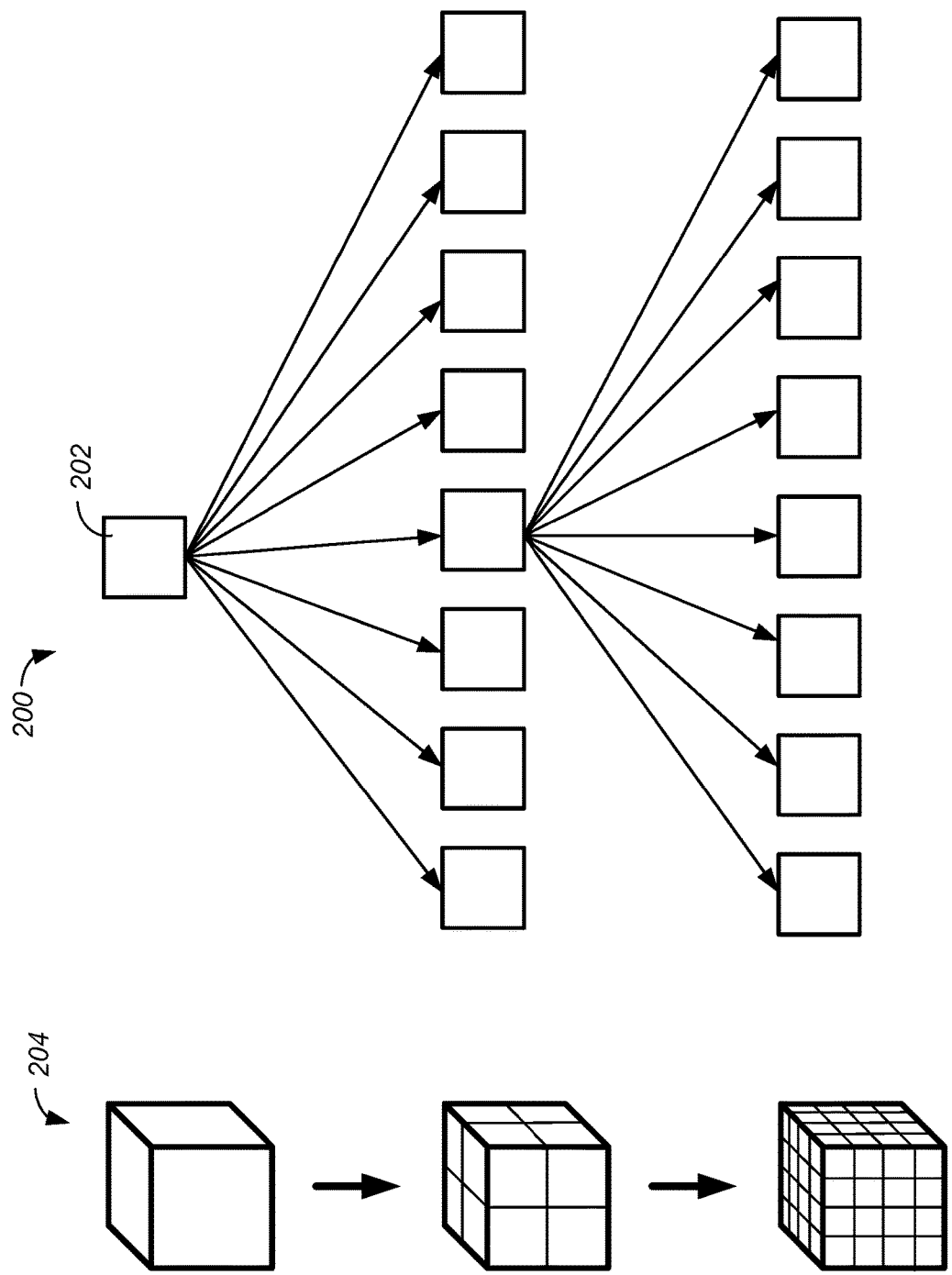
FIG. 2 illustrates an example recursive division of space and a corresponding tree data structure.

As an example, referring to FIG. 2, the position of points in the point cloud 110 can be encoded according to an octree 200, in which each node 202 of the octree 200 has exactly eight child nodes 204. A three-dimensional space 204 can be recursively subdivided into successively smaller octants. Each of these portions can be represented by a respective node 202 in the octree 200. The presence of a point in each portion can be indicated in the corresponding node 202 of the octree (e.g., using a bit "1" to signify the presence of point in the corresponding portion, or a bit "0" to signify an absence of point in the corresponding portion).

An example of encoding the position of points according to a tree data structure is shown in FIGS. 3A-3E. In this example, a number of points 300 on a single two-dimensional plane are encoded according to a quadtree (a tree data structure in which each node has exactly four child nodes). However, it is understood that points in a three-dimensional point cloud can be encoded in a similar manner according to an octree.

Figure 3A:
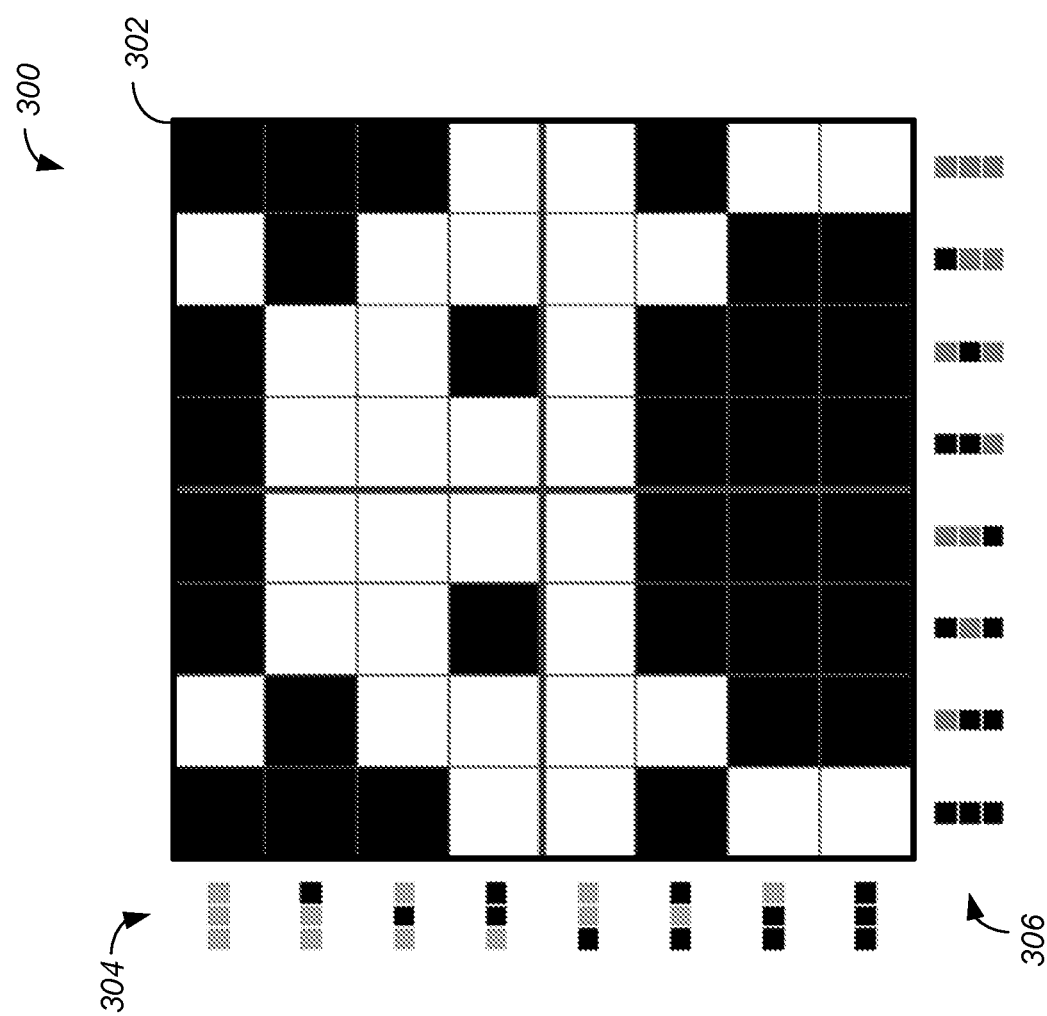
FIGS. 3A-3E illustrates an example encoding of points according to a tree data structure.

As shown in FIG. 3A, a number of points 300 are positioned on a two-dimensional plane. The presence of a point 300 at a particular position is indicated by a white box in a grid 302, whereas the absence of a point 300 at a particular position is indicated by a black box in the grid 302. The rows of the grid 302 are indexed according to respective binary sequences 304 (shown to the right of the grid 302, where black boxes indicate a bit "0" and colored boxes indicate a bit "1"). Similarly, the columns of the grid 302 are indexed according to respective binary sequences 306 (shown to the bottom of the grid 302, where black boxes indicate a bit "0" and colored boxes indicate a bit "1").

Figure 3B:
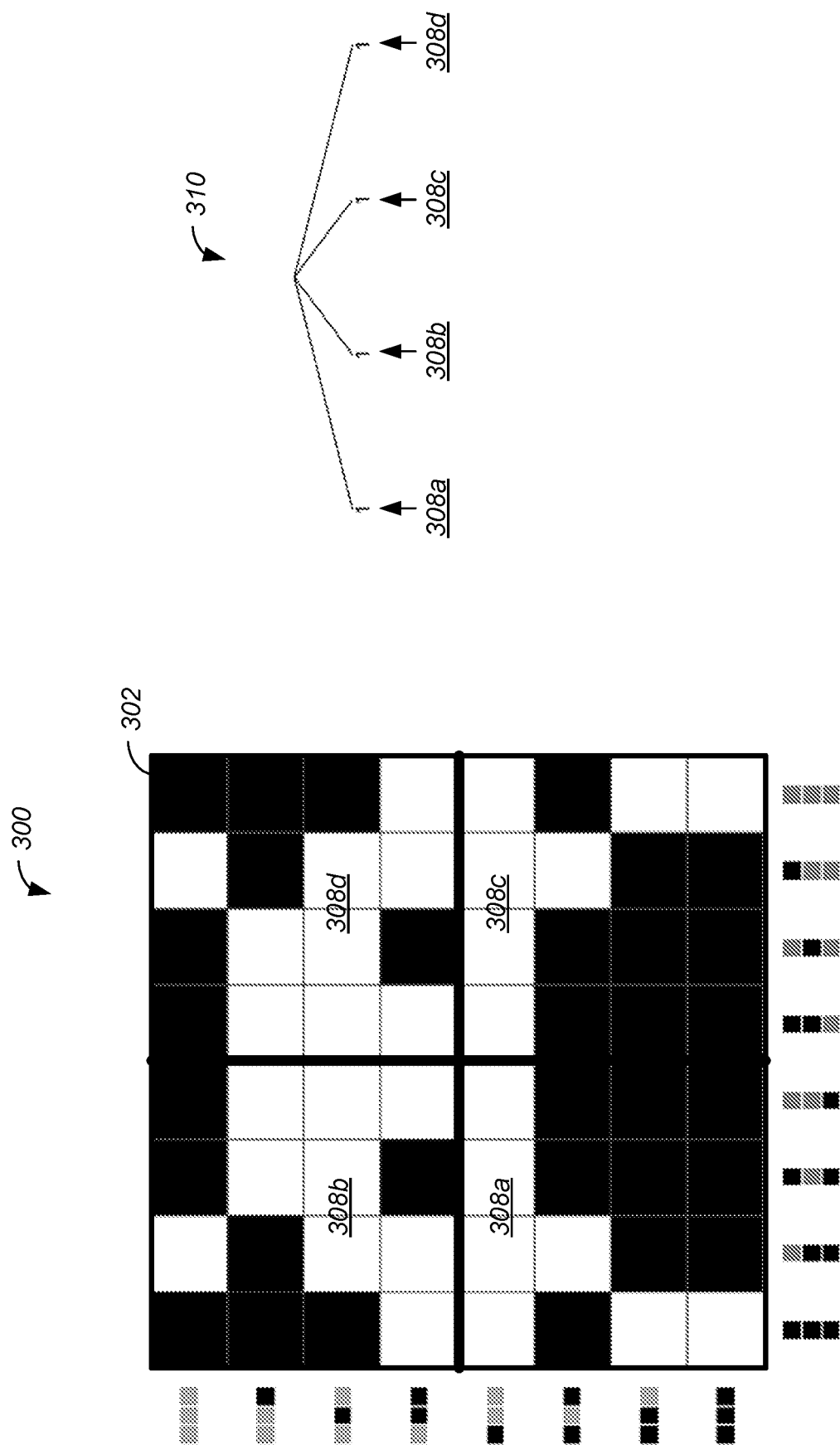

As shown in FIG. 3B, the grid 302 can be divided into four equally sized portions 308a-308d (e.g., squares). This division can be represented by a tree data structure 310 having a parent node, and four child nodes branching from the parent node. The presence of point or more points 300 in each portion 308a-308d can be indicated by a bit "1" in the corresponding child node. Here, as each of the portions 308a-308d includes at least one point 300, each of the child nodes is assigned a bit "1."

Figure 3C:
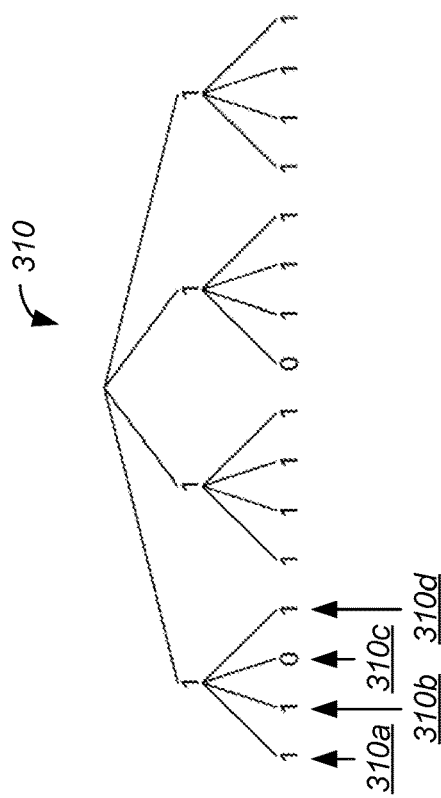
Figure 3C:
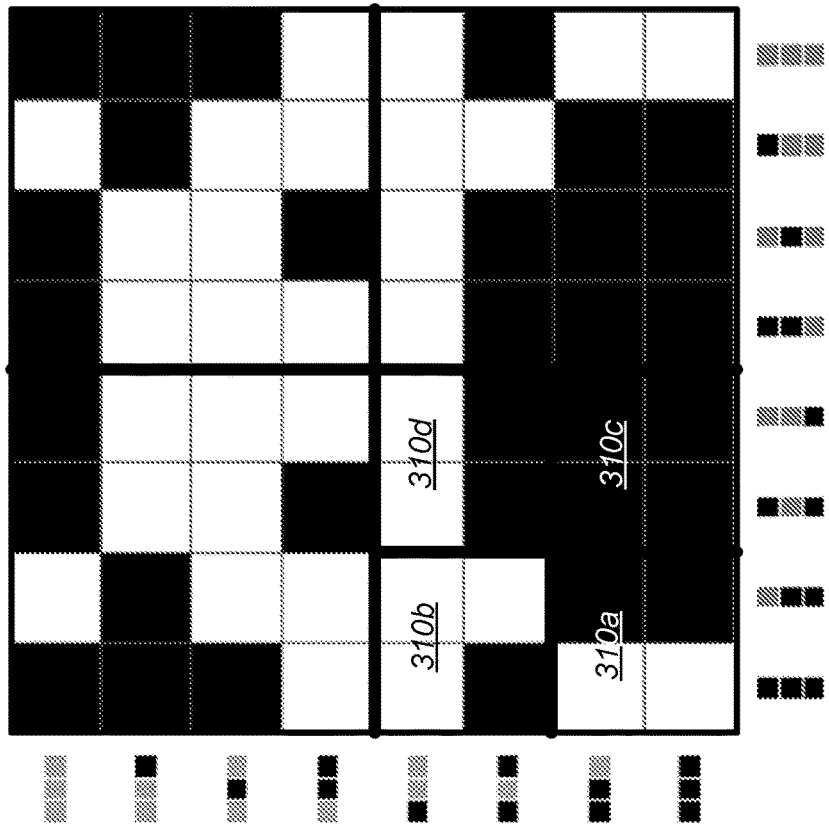

As shown in FIG. 3C, each portion 308a-308d can be further sub-divided into four equally sized sub-portions (e.g., squares). For example, the portion 308a can be sub-divided in portions 310a-310d. This division can be represented by the tree data structure 310 having, for the node corresponding to the portion on 308a, four child nodes branching from that node. The presence of point or more points 300 in each sub-portion 310a-310d can be indicated by a bit "1" in the corresponding child node. Here, as each of the sub-portions 310a, 310b, and 310d includes at least one point 300, the child nodes associated with those sub-portions are each assigned a bit "1." The child node associated with the sub-portion 310c is assigned a bit "0." Similarly, the other portions 308c-308d also can be sub-divided into four equally sub-portions each, and the presence of points in each of the sub-portions can be indicated by the tree data structure 310 in a similar manner as described above.

Figure 3D:
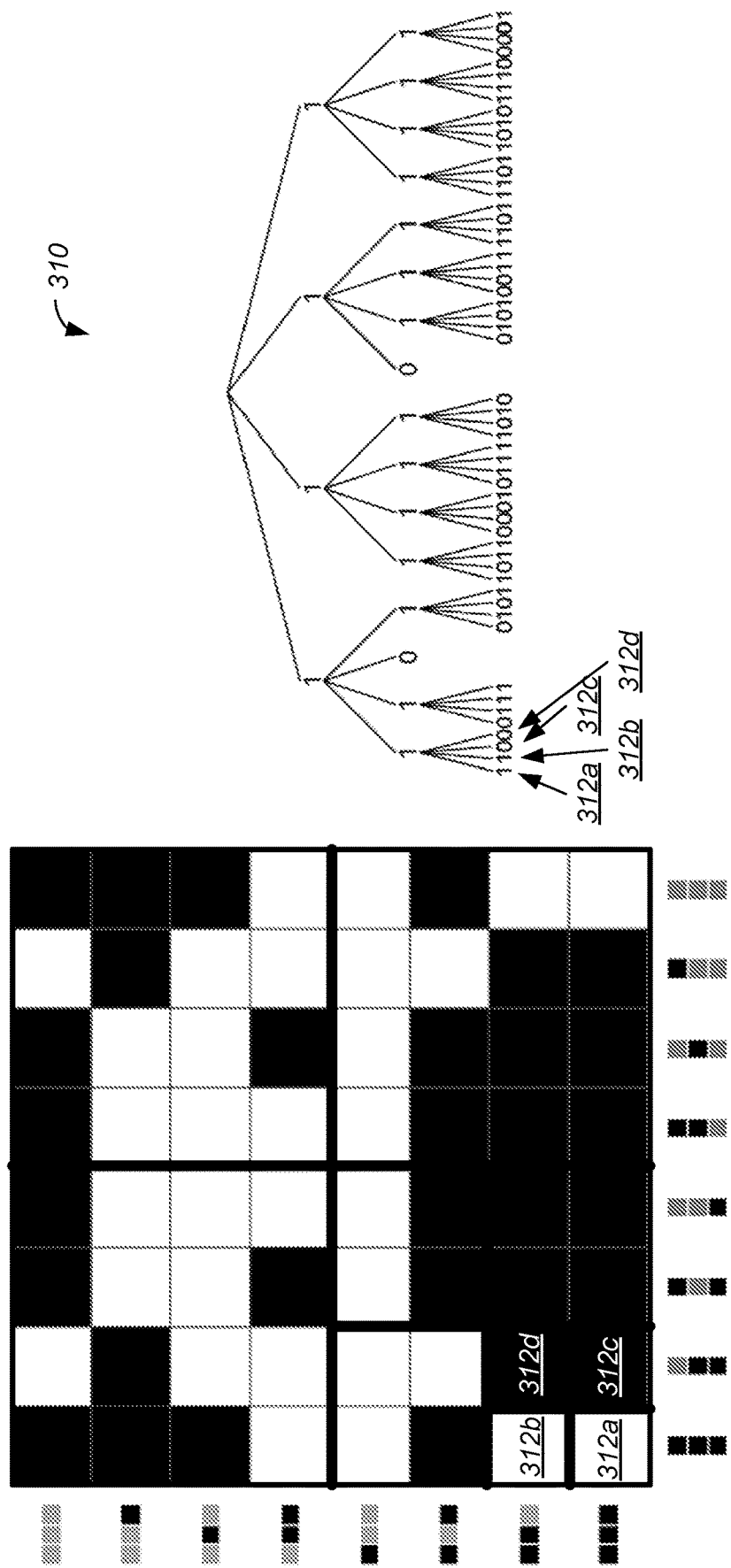
Figure 3E:
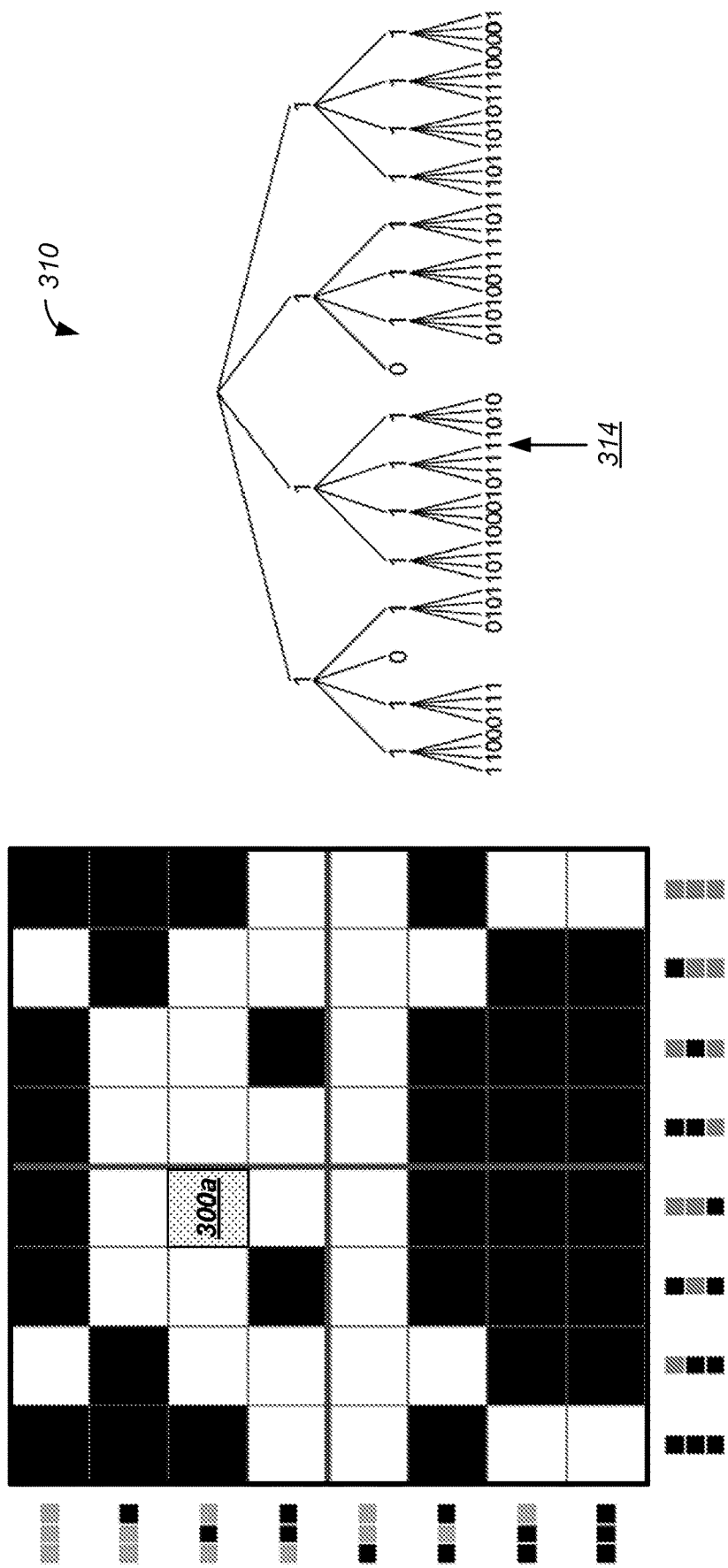

As shown in FIG. 3D, each sub-portion 310a-310d can be further sub-divided into four equally sized sub-portions (e.g., squares). For example, the sub-portion 310a can be sub-divided in sub-portions 312a-312d. This division can be represented by the tree data structure 310 having, for the node corresponding to the sub-portion 310a, four child nodes branching from that node. The presence of point or more points 300 in each sub-portion 312a-312d can be indicated by a bit "1" in the corresponding child node. Here, as each of the sub-portions 312a and 312b includes at least one point 300, the child nodes associated with those sub-portions are each assigned a bit "1." The child nodes associated with the sub-portions 310c and 310d are each assigned a bit "0." Similarly, the other sub-portions of the grid can be sub-divided into four equally sub-portions each, and the presence of points in each of the sub-portions can be indicated by the tree data structure 310 in a similar manner as described above.

The spatial position of a particular point 300 can be represented by one or more binary sequences. For example, the spatial position of a point 300a with respect to the horizontal axis can be represented by the binary sequence "011" (e.g., corresponding to the index of its column), and the spatial position of the point 300a with respect to the vertical axis can be represented by the binary sequence "101" (e.g., corresponding to the index of its row).

Although a tree data structure 310 having four levels is shown in FIGS. 3A-3D, in practice, a tree data structure can include any number of levels (corresponding to any number of spatial sub-divisions). Further, although FIGS. 3A-3D show a tree data structure 310 having four child nodes branching from each parent node (e.g., a quadtree), in practice, a tree data structure can have any number of child nodes branching from each parent node (e.g., 8 child nodes branching from each parent node, as with an octree).

Quantization According to Multiple Step Sizes:

In some implementations, during an encoding process, the position of a point can be partially quantized or scaled, such that a reduced number of bits can be used to represent the position (or approximate position) of the point. As an example, an encoder can partition each of the binary sequences representing the point's position into two portions: (i) a first portion including the first d bits of the binary sequence, where d is a particular depth (e.g., representing bits that have already been encoded by the encoder), and (ii) a second portion including the remaining bits of the binary sequence. The second portion can be quantized according to a chosen quantization parameter.

To illustrate, a binary representation of a point's x-position can be represented as $\{b_4, b_3, b_2, b_1, b_0\}$, where x is in the range 0 to 31 inclusive. For instance, x=21=0b10101 (i.e., a binary sequence "10101"). After encoding the first two tree levels, at depth d=2, the scaling depth, the first two bits of 0b10101 are discarded, leaving 0b101 (i.e., a decimal value of 5). The remainder can be quantized according to a step size of 2 (e.g., 0b101/2=0b10). This has the effect of reducing the range of the remainder part from decimal values 0 and 7, to decimal values 0 to 3. Since the range has been reduced by a factor of two, only two tree levels are required to signal the remainder, rather than the three levels of the remainder prior to quantization. The reduction in levels can be expressed as Floor(Log 2 (QS)), where QS is the quantization step size. A decoder that is informed that quantization occurred with a step size of 2 at tree depth 2 will decode four bits for the corresponding points (5−Floor (Log 2(2))=4). The decoder will scale the quantized portion of the position information (the two least significant bits, 0b10) by the quantization step size QS(0b10*2=0b100) and append the scaled value to the two most significant bits (0b10:0b100) resulting in a reconstructed position of 0b10100.

In some implementations, the quantization step size QS can be determined based on an integer quantization parameter QP of an exponential function $f(QP)=QS$. For example, the quantitation step size QS can be determined using the relationship $QS=2^{(QP-4)/6}$. In this example, an increase of QP by 6 (e.g., from 4 to 10) results in a doubling of the quantitation step size QS.

Performance of this "in-tree" geometry quantization has various effects. For example, this quantization eliminates levels from the sub-tree of sufficiently quantized nodes, thereby avoiding signaling occupancy for eliminated nodes. Further, this quantization reduces the number of coded points in the tree data structure. Further, this quantization compacts sparse surfaces into a less sparse form. Accordingly, information regarding a point cloud (e.g., the presence and/or position of one or more points in the point cloud) can be stored using less data (e.g., compared to techniques that do not utilization quantization).

In some implementations, all of the points in a point cloud can be encoded according to a tree data structure (e.g., an octree). This can be beneficial, for example, as it enables information regarding the points to be encoded and stored in a consistent manner, and according to a consistent degree of accuracy and/or precision.

However, in some implementations, a portion of the points in a point cloud can be encoded entirely according to a tree data structure, and at least some of the remaining points can each be encoded in part according to the same tree data structure and in part according to another technique. In some implementations, at least some of the remaining points can be encoded in part by explicitly signaling each of their locations relative to a tree node position (e.g., explicitly specifying the location of each of the points in one or more dimensions). This can be beneficial, for example, in reducing the computational resources required to encode the points according to the tree data structure (which in some cases may be higher than using an explicit signaling technique).

In some implementations, an encoder can distinguish between different subsets of points, depending on their proximity to other subsets of points. For example, an encoder can identify one or more subsets of points that are in proximity to one another, and encode those points entirely according to a tree data structure. The encoder can also identify one or more subsets of points that are isolated from the other subsets of points, and encode each of those points in part according to an explicit signaling technique. This can be beneficial, for example, as information regarding isolated points may be more encoded and stored more efficiently using an explicit signaling technique, rather than using a tree data structure.

In some implementations, isolated subsets of points can be identified during the encoding process of a tree data structure (e.g., during the recursive division of space into successively smaller portions) by identifying portions of space (e.g., octants) that are occupied by one or more points, but are surrounded by portions of space (e.g., other octants) that are not occupied by any points. The encoder can designate the points within this occupied portion of space as "isolated" points, and encode the points in part according to an explicit signaling technique. The encoder can encode the remaining points according to a tree data structure (e.g., an octree). In some implementations, sets of isolated points may be referred to as inferred direct coding mode (IDCM) nodes.

In some applications, the precise position of isolated points may have less significance than dense non-isolated subsets of points. For example, an isolated point may have a larger position uncertainty due to sampling noise than dense non-isolated subsets of points where noise reduction techniques based on the correlation of local point positions may be used. When encoded with a tree data structure (such as an octree or quad tree), even when using an explicit signaling technique, this excess precision and noise may result in less efficient compression.

In some implementations, an encoder can specify that a quantization parameter QP (and correspondingly, a quantization step size QS) be used to quantize isolated points during the encoding process (e.g., IDCM nodes). In some implementations, the quantization parameter QP can be signaled in the "geometry slice" (e.g., the data structure representing the points). In some implementations, the quantization parameter QP can be signaled in the header of the geometry slice. In other implementations, the quantization parameter may be signaled in a parameter set. In another implementation, the quantization parameter may be derived from a base value signaled in a parameter set and an offset signaled in the header of a geometry slice. In another implementation, the quantization parameter may be derived from a base value and an offset signaled in a corresponding tree node at the scaling depth of a geometry slice.

Each node that represents, in part, explicitly coded point positions is quantized by an encoder according to the corresponding quantization step size to be used for isolated points. In some implementations, the quantization step size is an integer power of two. In other implementations, the step size is an exponential function of the quantization parameter. In some implementations, where isolated points are not correlated with other geometry information, the benefit of using a non power of two quantization step size may be of limited utility since the difference in cost in terms of encoded bits for two step sizes $2^n$ and $2^n-1$ may not be reduced, while the distortion attributable to the larger step size may be larger; hence in terms of rate-distortion performance the larger of these two step sizes may be both undesirable for compression and more complex for an implementation.

In some implementations, the quantization node size (representing the number of bits of position information that is to be quantized) is the same size as the tree node containing the isolated points (e.g., the IDCM node). In other implementations, the quantization node size may be smaller than the tree node and may be indicated by other means. In some implementations, the other means is a quantization tree depth or node size signaled in a slice header or parameter set.

After quantization, an encoder uses the explicit signaling method to encode the quantized point position. The number of bits to encode is derived from the node size less any bits eliminated by quantization, e.g., Floor(Log 2(QS)).

A decoder encountering a node with explicitly coded point positions uses the quantization parameter information signaled in the bitstream to determine the step size and the number of bits to decode using the explicit signaling method. The number of bits to decode is derived from the node size less any bits eliminated by quantization, e.g., Floor(Log 2(QS)).

A decoder scales the quantized portion of the position information according to the step size and combines it with the node position to determine a reconstructed point position.

Since a node with explicitly coded point positions may occur at any depth within the tree data structure, a decoder must take care in cases where the step size is larger than the node size (e.g., in cases where all position bits have been eliminated by quantization. A decoder that would normally expect to use the value of Floor(Log 2(QS)) to determine the difference in bits between the reconstructed point representation and the number of decoded bits (including any contribution from the node position) must limit this value to the log 2 quantization node size.

In some implementations, to simplify implementations, the quantization parameter, or quantization step size may be constrained according to the level of the tree data structure in which the node with explicitly coded point positions resides. The quantization parameter (or step size) may be limited such that Floor(Log 2(QS)) is no larger than the node size. In other implementations, the limitation may be such that Ceiling(Log 2(QS)) is no larger than the node size.

In some implementations, the quantization parameter, and therefore the derived quantization step size, used for quantization/scaling of explicitly coded point positions can be limited according to the node size of the current tree level. In these implementations, node sizes are not required to be a cube, and the smallest node size dimension is used to derive the limit value. Example code for these implementations is shown below:

```
if (currentDepth < scalingDepth) {
    // If planar is enabled, the planar bits are not quantised (since
    // the planar mode is determined before quantisation)
    quantNodeSizeLog2 = currentNodeSizeLog2;
    if (gps.geom _planar_mode_enabled_flag)
        quantNodeSizeLog2 -= 1;
    // quantization node size cannot be negative
    for (k = 0; k < 3; k++)
        quantNodeSizeLog2[k] = std::max(0, quantNodeSizeLog2[k]);
    // limit the idcmQp such that it cannot overquantize the node
    minNs = quantNodeSizeLog2.min( );
    idcmQp = gps.geom_base_qp + gps.geom_idcm_qp_offset;
    idcmQp <<= gps.geom_qp_multiplier_log2;
    idcmQp = std::min(idcmQp, minNs * 8);
}
```

In some implementations, an encoder can specify that a first "explicit" quantization parameter $QP_e$ (and correspondingly, a first quantization step size $QS_e$) be used to quantize isolated points during the encoding process (e.g., IDCM nodes), whereas a second "internal" quantization parameter $QP_i$ (and correspondingly, a second quantization step size $QS_i$) be used to quantize non-isolated points (e.g., non-IDCM nodes) during the encoding process. In some implementations, the explicit quantization parameter $QP_e$ can be signaled in the "geometry slice" (e.g., the data structure representing the points). In some implementations, the explicit quantization parameter $QP_e$ can be signaled in the header of the geometry slice. In other implementations, the explicit quantization parameter $QP_e$ may be signaled in a parameter set. In another implementation, the explicit quantization parameter $QP_e$ may be derived from a base value signaled in a parameter set and an offset signaled in the header of a geometry slice. In another implementation, the explicit quantization parameter $QP_e$ may be derived from the second by means of an offset signaled in the header of a geometry slice or in a parameter set. In some implementations, $QP_e$ may be called an IDCM QP.

To illustrate, example syntax for a data structure (e.g., a "geometry slice") is shown below.

TABLE 1

Example syntax for a geometry slice.

|  | Descriptor |
|---|---|
| geometry_parameter_set( ) { | |
|   gps_geom_parameter_set_id | ue(v) |
|   gps_seq_parameter_set_id | ue(v) |
|   gps_box_present_flag | u(1) |
|   if( gps_box_present_flag ){ | |
|     gps_gsh_box_log2_scale_present_flag | u(1) |
|     if( gps_gsh_box_log2_scale_present_flag == 0 ) | |
|       gps_gsh_box_log2_scale | ue(v) |
| } | |

TABLE 1-continued

Example syntax for a geometry slice.

| | Descriptor |
|---|---|
| unique_geometry_points_flag | u(1) |
| geometry_planar_mode_flag | u(1) |
| geom_planar_mode_th_IDCM | ue(v) |
| if( geometry_planar_mode_flag ){ | |
|     geom_planar_mode_th[0] | ue(v) |
|     geom_planar_mode_th[1] | ue(v) |
|     geom_planar_mode_th[2] | ue(v) |
| } | |
| neighbour_context_restriction_flag | u(1) |
| inferred_direct_coding_mode_enabled_flag | u(1) |
| bitwise_occupancy_coding_flag | u(1) |
| adjacent_child_contextualization_enabled_flag | u(1) |
| log2_neighbour_avail_boundary | ue(v) |
| log2_intra_pred_max_node_size | ue(v) |
| log2_trisoup_node_size | ue(v) |
| geom_scaling_enabled_flag | u(1) |
| if( geom_scaling_enabled_flag ) { | |
|     geom_base_qp | ue(v) |
|     geom_direct_mode_qp_offset | se(v) |
| } | |
| gps_implicit_geom_partition_flag | u(1) |
| if( gps_implicit_geom_partition_flag ) { | |
|     gps_max_num_implicit_qtbt_before_ot | ue(v) |
|     gps_min_size_implicit_qtbt | ue(v) |
| } | |
| gps_extension_present_flag | u(1) |
| if( gps_extension_present_flag ) | |
|     while( more_data_in_byte_stream( ) ) | |
|         gps_extension_data_flag | u(1) |
| byte_alignment( ) | |
| } | |

As shown above, the quantization parameter $QP_e$ used to quantize isolated points (e.g., IDCM nodes) can be signaled using a variable geom_direct_mode_qp_offset in the geometry parameter set. In this example, geom_direct_mode_qp_offset would be a delta to geom_base_qp (e.g., a delta or offset to the second quantization parameter $QP_i$ used quantize non-isolated points).

As another example, as shown below, the quantization parameter $QP_e$ used quantize isolated points can be signaled using the variable geom_direct_mode_qp_offset in the header of the geometry slice, where sliceQp=geom_base_qp+slice_qp_offset, and geom_direct_mode_qp_offset is either a delta to the derived sliceQp, or a delta to geom_base_qp.

TABLE 2

Example syntax for a geometry slice header.

| | |
|---|---|
| if( geom_scaling_enabled_flag ) { | |
|     geom_slice_qp_offset | se(v) |
|     geom_direct_mode_qp_offset | se(v) |
|     geom_octree_qp_offsets_enabled_flag | u(1) |
| } | |

In some implementations, a depth is signaled at which tree nodes may be quantized. This depth may be called the scaling depth. In some implementations, these nodes may also contain a quantization parameter offset that is used to indicate the degree of scaling to apply to points reconstructed from the subtree represented by the node. However, since nodes that contain explicitly coded point positions may occur earlier in the tree, before the appropriate quantization parameter offset is signaled, these nodes may escape quantization and contribute to a decreased compression efficiency.

In some implementations, nodes that contain explicitly coded point positions that occur prior to the signaled in-tree quantization depth may be quantized (or scaled) according to the first quantization parameter (derived from, for example, geom_direct_mode_qp_offset).

In some implementations, nodes that contain expressly coded point positions occurring at depths greater than or equal to the quantization depth may quantized using the first quantization parameter if the node is a descendent of a subtree that has not been quantized (or quantization has acted as the identity function).

Some implementations will, for nodes that contain explicitly coded point positions occurring at depths greater than or equal to the quantization depth, not apply further quantization or adjust the scaling in a decoder, causing these nodes to use the second quantization parameter. In other words, since at the point of quantization, a node is determined to not contain explicitly coded point positions, it has been quantized using the second quantization parameter. This avoids the burden of performing two rounds of quantization or scaling; for instance, inverse scaling the explicitly coded portion of the point position using the second, and then inverse scaling the resulting remaining quantized portion (including the scaled explicitly coded portion).

In some implementations, nodes that contain explicitly coded point positions occurring at depths greater than or equal to the quantization depth are further quantized if the first quantization parameter is larger than the node quantization parameter.

In other implementations where nodes that contain explicitly coded point positions that are limited to using quantization step sizes that are a power of two, nodes that contain explicitly coded point positions occurring at depths greater than or equal to the quantization depth are further quantized. In some embodiments, the further quantization is based upon the difference between the first and second quantization step sizes. For example, a subtree that has been quantized with a quantization node size of $2^7$, with a step size of 3 (implying a quantized volume of $2^6$ and consequently an effective subtree height of 6), which contains an explicitly coded point position node at a relative depth of 2 (e.g., represents a quantized volume of $2^{-}$ 4), and where the quantization step size for such nodes is 8, the node is further quantized by the step size Floor(8/3)=2, resulting in an concatenated quantization step size of 6. In another embodiment the step size for further quantization is derived according to $2^{(Log\ 2(8)-Ceiling(Log\ 2(3)))}=2$. In another embodiment the step size for further quantization is derived according to $2^{(Log\ 2(8)-Floor(Log\ 2(3)))}=4$, yielding a concatenated step size of 12.

In another implementation, a third quantization parameter is signaled in a slice header or parameter set for use by nodes that contain explicitly coded point positions occurring at depths greater than or equal to the quantization depth.

Figure 4A:
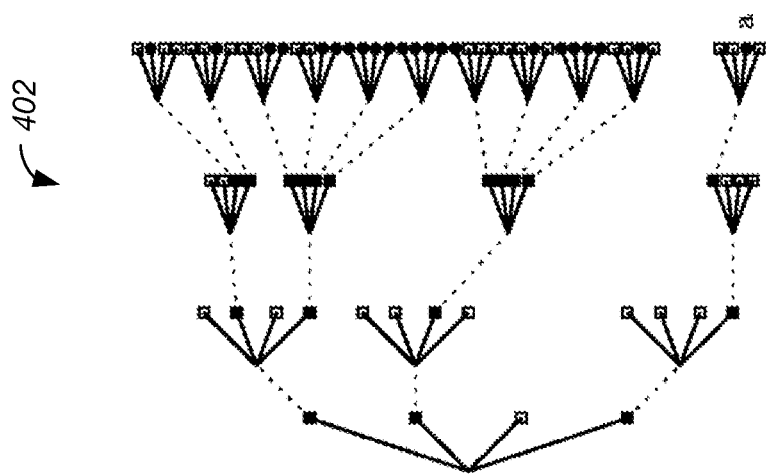
FIGS. 4A-4C shows an example application of the techniques described herein.
Figure 4A:
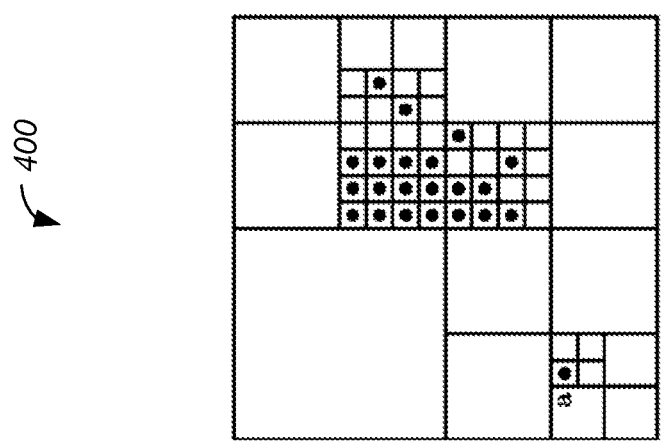
Figure 4B:
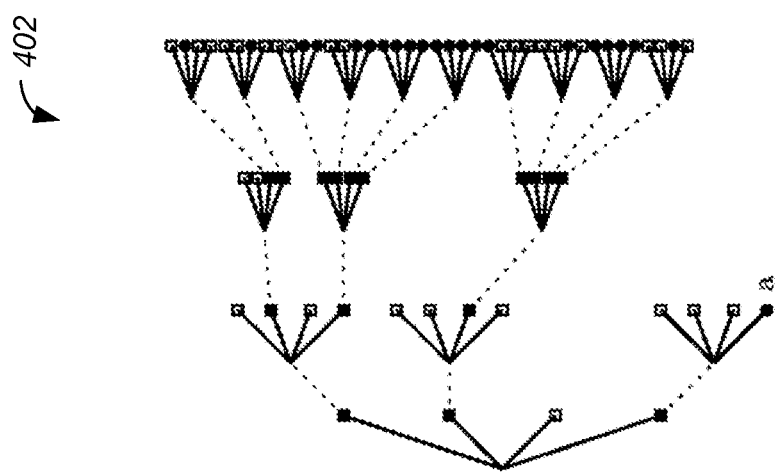
Figure 4B:
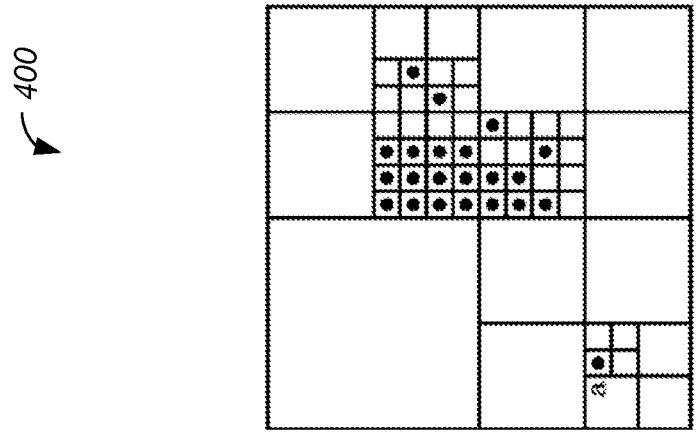
Figure 4C:
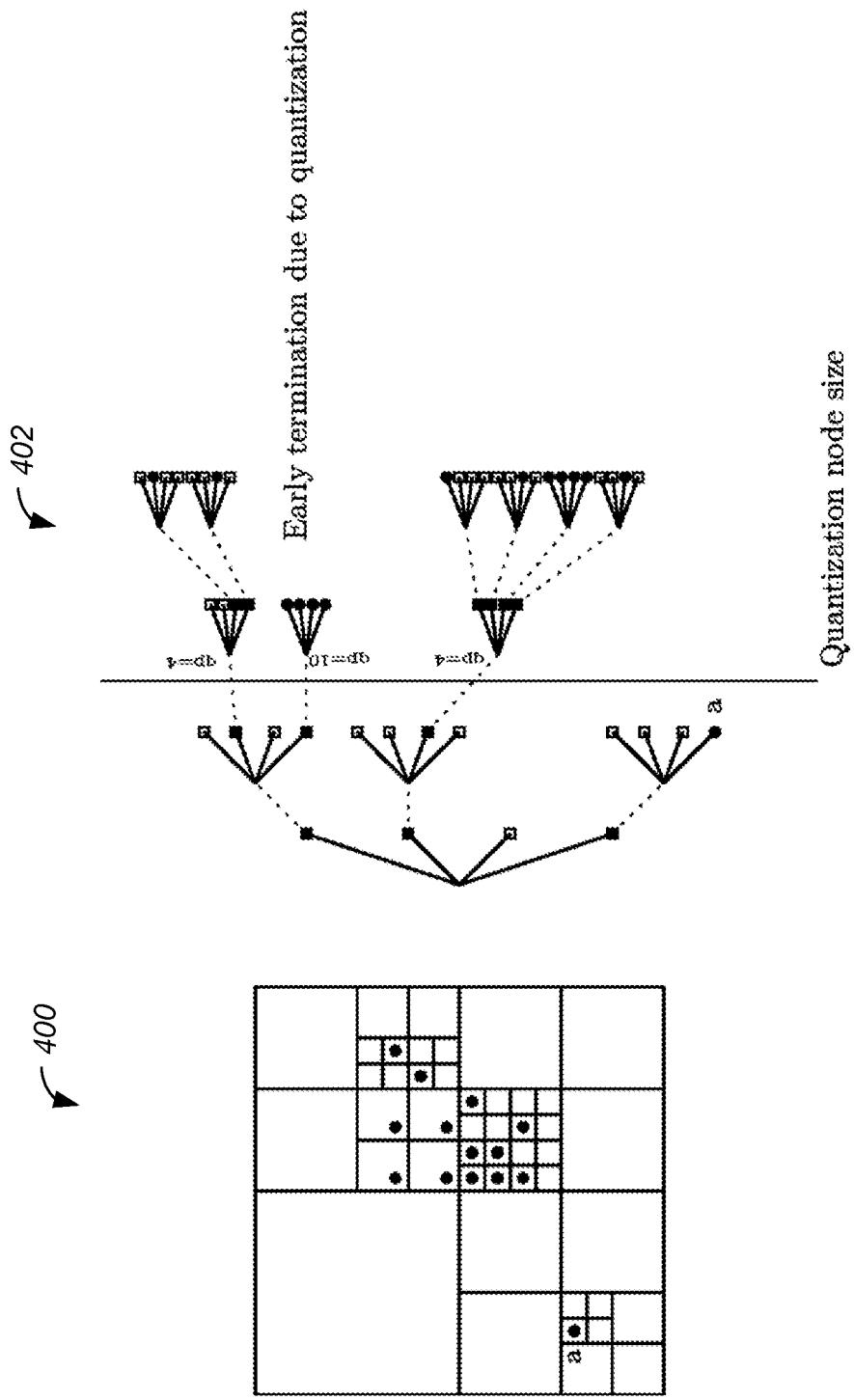

FIGS. 4A-4C shows an example application of the techniques described herein. FIG. 4A shows an example recursively divided three-dimensional space 400 that includes a number of points (represented by circles), and a corresponding tree data structure 402. In the tree data structure, filled squares represent occupied internal tree nodes, empty squares represent unoccupied children nodes, and circles represent leaf nodes. In this example, the point labeled "a" is an isolated point. Although the tree data structure 402 shown in FIGS. 4A-C is a quadtree (e.g., encoding points in two-dimensions), in some implementations, the tree data structure 402 can be an octree (e.g., encoding points in three-dimensions).

As shown in FIG. 4B, the tree data structure 402 can use IDCM to encode the isolated point "a," causing the tree to be terminated early with respect to that point (e.g., several levels and nodes leading up to point "a" in FIG. 4A are not present in FIG. 4B). This determination is performed at the position marked "a" in the tree.

As shown in FIG. 4C, the tree is divided into two parts by a line indicating the quantization node size. The nodes immediately after (e.g., to the right of) the line are allowed to signal a QP offset (e.g., marked with example derived QP values in FIG. 4C). The subtree marked qp=10 is terminated early due to the quantization eliminating one level of the tree. The node "a" occurs before the quantization node size line and therefore ordinarily is not quantized. However, as described herein, the node "a" can be quantized according to an explicit signaling method.

Encoding Point Cloud Information Using Non-Cubic Tree Nodes:

In the example shown in FIG. 2, a tree data structure has a number of nodes, where each parent node has exactly eight children node (e.g., an octree), corresponding to the recursive division of space into successively smaller cubic sub-portions. This can be useful, for example, in encoding points in generalized use cases (e.g., when the points are dispersed relatively uniformly in three-dimensional space).

However, this need not always be the case. For instance, in some implementations, a tree data structure can have a number of different levels. For at least one of the levels, each of the parent nodes of that level can have a respective first number of child nodes. Further, for at least some of the other levels, each of the parent nodes of that level can have a respective second and different number of child nodes. This configuration corresponds to the recursive division of space into successively smaller non-cubic and/or cubic sub-portions. This can be useful, for example, in encoding points that are distributed in three-dimensional space, but are relatively concentrated with respect to a particular dimension relative to other dimensions. For example, points may be distributed along an elongated rectangular prism (e.g., a point cloud representing the surface of a generally planar object). Accordingly, recursively dividing the space into elongated rectangular prisms (at least in part) may be more beneficial than dividing the space into cubic portions (in which may result in many cubic portions having few points or no points at all).

Figure 5:
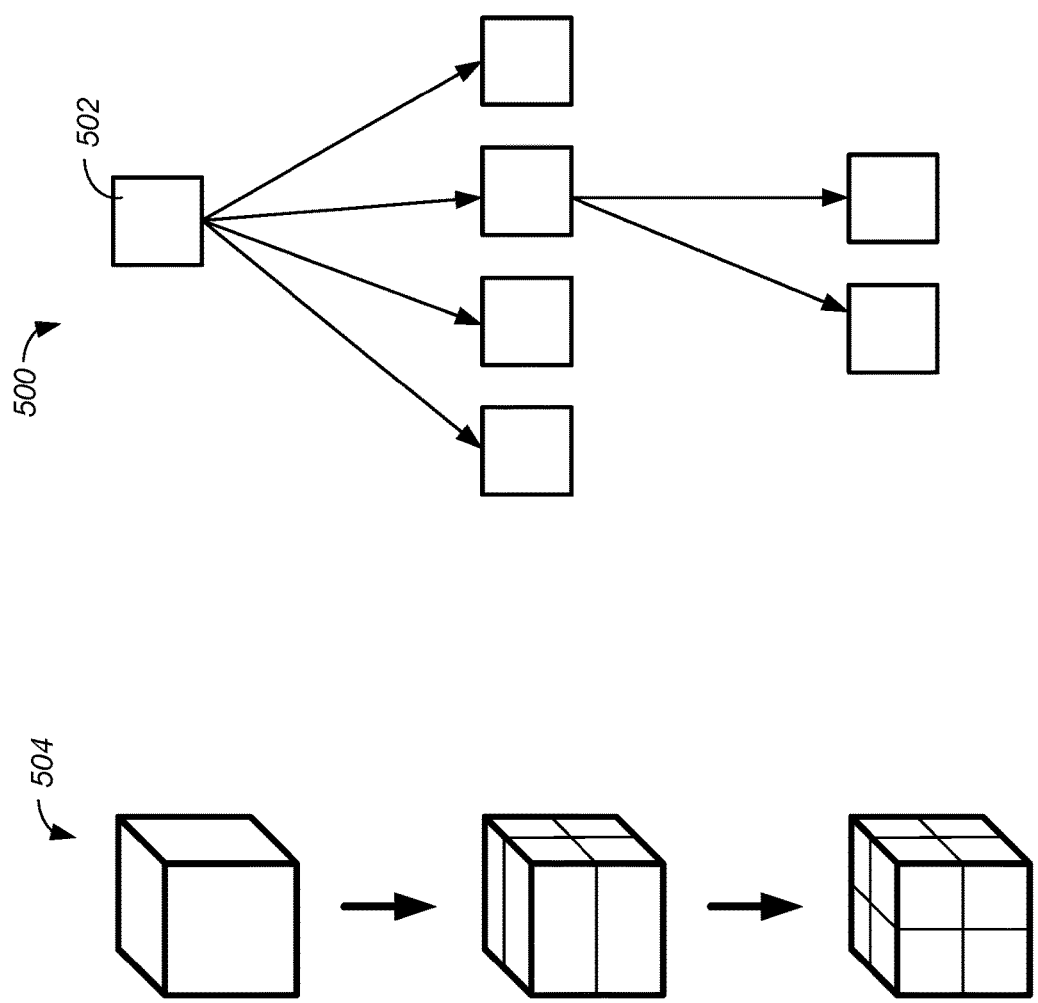
FIG. 5 illustrates another example recursive division of space and a corresponding tree data structure.

As an example, referring to FIG. 5, the position of points in the point cloud 110 can be encoded according to a quadtree plus binary tree (QTBT) 500, in which each node 502 of first level of the QTBT 500 has exactly four child nodes 502 (e.g., a quadtree), and each node of the second level of the QTBT 500 has exactly two child nodes 502 (e.g., a binary tree). Successive levels can alternate between a quadtree arrangement and binary tree arrangement. Accordingly, a three-dimensional space 504 can be recursively subdivided into smaller elongated quadrants, then into smaller cubic portions, then into smaller elongated quadrants, then into smaller cubic portions, and so forth. Each of these portions can be represented by a respective node 502 in the octree 500. The presence of a point in each portion can be indicated in the corresponding node 502 of the QTBT 500 (e.g., using a bit "1" to signify the presence of point in the corresponding portion, or a bit "0" to signify an absence of point in the corresponding portion).

Although a QTBT arrangement is shown in FIG. 5, in practice, a data tree structure can have other arrangements. For example, a data tree structure can have a number of different levels, where the parent nodes of each level have any number of child nodes each (e.g., the parent nodes of each level can have two, four, eight, sixteen, or any other number of children nodes each).

In some implementations, a tree data structure can initially have a non-cubic arrangement (e.g., QTBT arrangement) for one or more upper levels, but can have a cubic-arrangement (e.g., octree arrangement) for the remaining lower levels.

In some implementations, an encoder or decoder processes a node in particular ways, depending on whether the nodes spatially neighboring that node are occupied. For example, the encoded occupancy information of a node may be contextualized according to whether neighboring nodes are occupied or not. In situations in which points are encoded according to an octree arrangement, it may not be necessary to explicitly indicate this arrangement in every level of the tree data structure. For example, as each parent node will always be sub-divided into exactly eight child nodes, an encoder or decoder can readily determine the size, shape, and orientation of each node and its neighboring nodes, without requiring such information to be explicitly signaled.

However, in non-cubic arrangements (e.g., a QTBT arrangement), the arrangement of the tree data structure can be explicitly indicated, such that the encoder and decoder can accurately determine the size, shape, and orientation of each node and its neighboring nodes. For example, for each level of a tree data structure, the tree data structure can explicitly signal that each of the nodes of that level has a particular number of child nodes (e.g., two, four, eight, etc.) and their spatial correspondence. This may be referred to as the "partitioning state" of the nodes in that level. During the encoding or decoding process, the encoder or decoder can reference this parameter to determine the size, shape, and orientation of each node.

In some implementations, the arrangement of the tree data structure may be explicitly indicated by a parameterized process that is executed by both the encoder and decoder to determine the partitioning state of nodes in a given level of the tree. For example, one such parameterization may cause levels of four child and two child nodes to occur before any eight child nodes; conversely, another parameterization may cause all eight child nodes to occur before any four child or two child nodes.

As an example, the structure of a node can be defined according to the following pseudo-code:

TABLE 3

Pseudo-code for defining the structure of a node.

struct PCCOctree3Node {
// 3D position of the current node's origin (local x,y,z = 0).
Vec3<int32_t> pos;
// pattern denoting occupied neighbour nodes.
//    32 8 (y)
//     \ |/
// 2--n--1 (x)
//    /|
//   4 16 (z)
uint8_t neighPattern = 0;
// The current node's number of siblings plus one.
// ie, the number of child nodes present in this node's parent.
uint8_t numSiblingsPlus1;
// The occupancy map used describing the current node and its siblings.
uint8_t siblingOccupancy;
// The qp used for geometry quantisation
int qp;
// planar; first bit for x, second bit for y, third bit for z
uint8_t planarPossible = 7;

TABLE 3-continued

Pseudo-code for defining the structure of a node.

```
uint8_t planePosBits = 0;
uint8_t planarMode = 0;
};
```

In this example, the partitioning state of the neighboring node is represented by three bits indicating which of the x, y, and z components are coded according to the partitioning scheme. For example, for octree partitioning (e.g., each node in the level is partitioned into eight corresponding child nodes), all three bits are coded. As another example, for quad tree partitioning (e.g., each node in the level is partitioned into fourth corresponding child nodes), only two of the three bits are coded. As another example, for binary tree partitioning (e.g., each node in the level is partitioned into two corresponding child nodes), only one bit is coded.

In some implementations, to enable efficient determination of spatially neighboring nodes, a three-dimensional sparse occupancy map may be constructed. A memory efficient implementation may choose to store in each byte of memory, the occupancy information of an entire octree node including of eight bits (one byte) in a memory location of a linearly addressed array. In some implementations, the memory location is based upon a Morton code representation of the spatial position information of the node, less the least significant bit of each component which form a three-bit Morton code index into the eight-bit occupancy word. A three-dimensional sparse occupancy map may be constructed by scanning a sequence of nodes in the tree traversal order.

In some implementations, a three-dimensional sparse occupancy map may be constructed from non-cubic nodes in a non-cubic tree arrangement by altering the construction of the memory location of a node. In some embodiments, only the least significant bits of the spatial position information that correspond to bits coded in a single layer are removed. For example, if a node encodes four child nodes, each child node may have the position (x2.x1.x0, y2.y1.y0, z2.z1), where no z0 bit is coded. A Morton code may be constructed as x2.y2.z2.x1.y1.z1, discarding just the x0 and y0 bits of the position information.

In some implementations, nodes in a non-cubic tree arrangement can be quantized according to a quantization parameter (QP). In some implementations, the degree of quantization can vary between nodes within the same tree level at a particular quantization or scaling depth. Since quantization may alter the height of the subtree beneath the quantized node, in some implementations, the partitioning state of nodes in levels in a first subtree with a first QP and a particular height may be necessarily different from that of a second subtree with a second different QP and a different particular height. For instance, two nodes in the same level may, since they belong to subtrees with different QPs, have different partitioning states.

In some embodiments, information can be stored in each node to identify the partitioning state of the node (e.g., the partition state of the node that was determined when the node, or parent node, was decoded). In some embodiments this information may include a three-bit value that identifies which of the x, y, and/or z bits are common to the most recent level. When constructing a three-dimensional sparse occupancy map, the memory location of a node is determined using the position information of the node and the partitioning state of the node. To continue the previous example, the child node with position (x2.x1.x0, y2.y1.y0, z2.z1) stores alongside it the partitioning state information of three bits 0b110 indicating the x and y bits are the most recently coded.

In some embodiments, information can be stored in on a per-level basis to identify the partitioning state of the nodes of each level. For example, when constructing a three-dimensional sparse occupancy map, the information regarding the partitioning states of the nodes of each level can be stored in memory locations that are specific to that level. The information can be selectively retrieved on from the occupancy map on per-level basis (e.g., based on indication of a particular level of tree, such as a coded axis of the current level of the tree and/or a previous level of the tree).

As discussed above, in some implementations, a tree data structure can initially have a non-cubic arrangement (e.g., QTBT arrangement) for one or more upper levels, but can have a cubic arrangement (e.g., octree arrangement) for the remaining lower levels. In some implementations, an encoder can generate a tree data structure such that it has a non-cubic arrangement only for levels (e.g., depths) higher than the quantization or scaling depth. For levels lower than the quantization or scaling depth, the encoder can generate the tree data structure such that it only has a cubic arrangement (e.g., octree) for those levels.

Example Processes

Figure 6A:
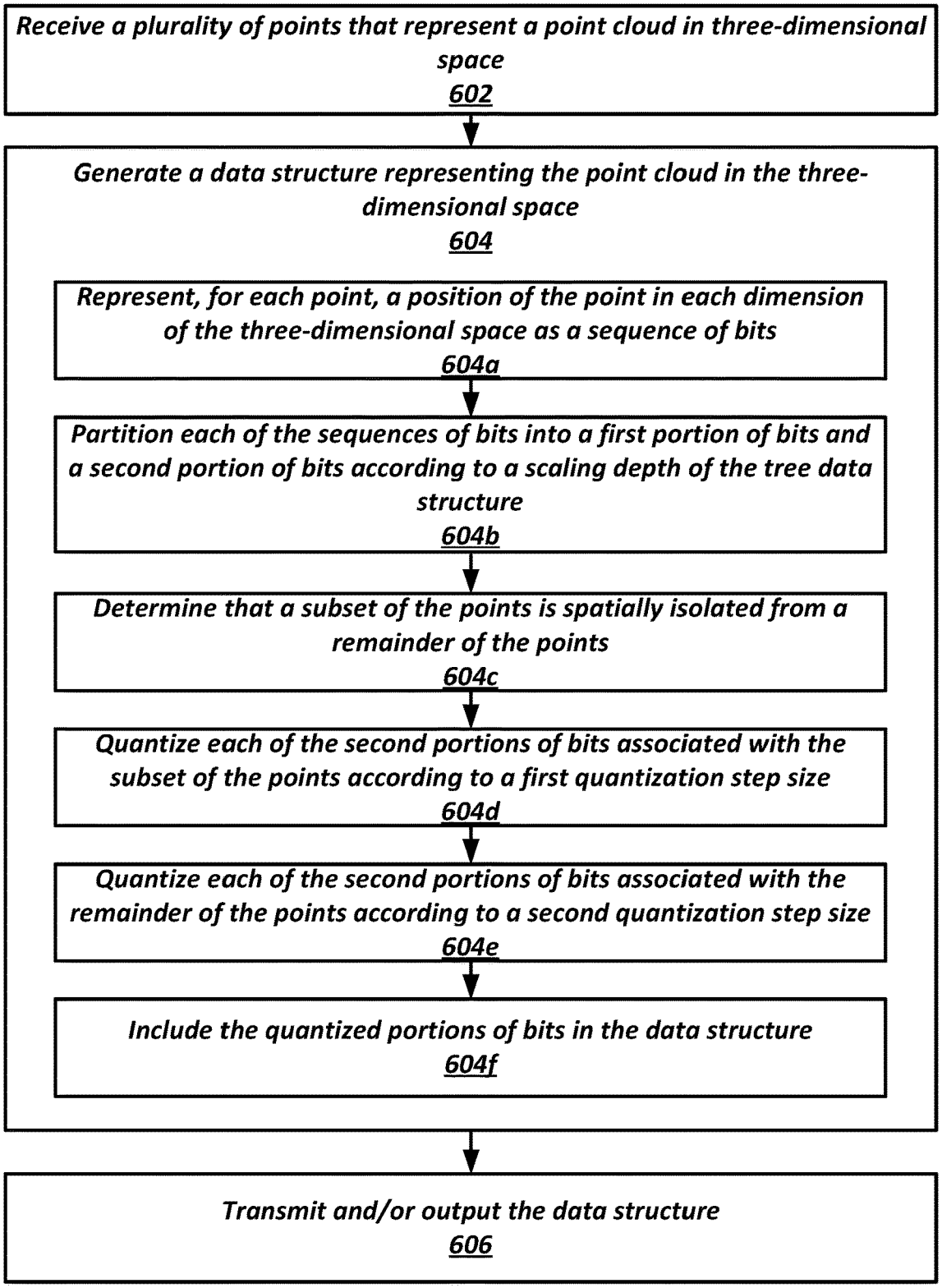
FIG. 6A illustrates an example process of generating a data structure representing a point cloud.

FIG. 6A shows an example process 600 for generating a data structure representing a point cloud in three-dimensional space. The process 600 can be performed, at least in part, using one or more devices (e.g., one or more of the computer systems shown in FIG. 10).

According to the process 600, a computer system receives a plurality of points that represent a point cloud in three-dimensional space (block 602).

The computer system generates a data structure representing the point cloud in the three-dimensional space (block 604).

Generating the data structure includes representing, for each point, a position of the point in each dimension of the three-dimensional space as a sequence of bit (block 604a). The position of the point is represented according to a tree data structure. In some implementations, the tree data structure can be an octree.

Further, the sequences of bits are partitioned into a first portion of bits and a second portion of bits according to a scaling depth of the tree data structure (block 604b).

A determination is made that a subset of the points is spatially isolated from a remainder of the points (block 604c).

In some implementations, determining that the subset of the points is spatially isolated from the remainder of the points can include determining that the subset of the points is spatially isolated from the remainder of the points at a first depth of the tree data structure, where the first depth is less than or equal to the scaling depth. Each of the second portions of bits associated with the subset of the points can be quantized according to the first quantization step size responsive to the determination.

In some implementations, determining that the subset of the points is spatially isolated from the remainder of the points at the first depth can include determining that, at the first depth, the subset of the points occupies one or more first nodes of the tree data structure, and determining that, at the first depth, the remaining of the points occupies one or more second nodes of the tree data structure, where the one or more first nodes are not adjacent to any of the one or more second nodes.

Each of the second portions of bits associated with the subset of the points is quantized according to a first quantization step size (block 604*d*).

Each of the second portions of bits associated with the remainder of the points (e.g., the points that are not associated with the subset of the points) is quantized according to a second quantization step size, where the first quantization step size is different from the second quantization step size (block 604*e*).

The quantized portions of bits is included in the data structure (block 604*f*).

The data structure is transmitted and/or outputted (block 606).

In some implementations, generating the data structure can also include including a header in the data structure indicating the first quantization step size.

In some implementations, the tree data structure can include a plurality of nodes arranged according to a plurality of tree levels. Further, a first node of the plurality of nodes can expressly signal the position of one of more of the points of the point cloud. The quantization parameter and/or the quantization step size can be constrained according a tree level of the first node from among the plurality of tree nodes of the tree data structure.

Figure 6B:
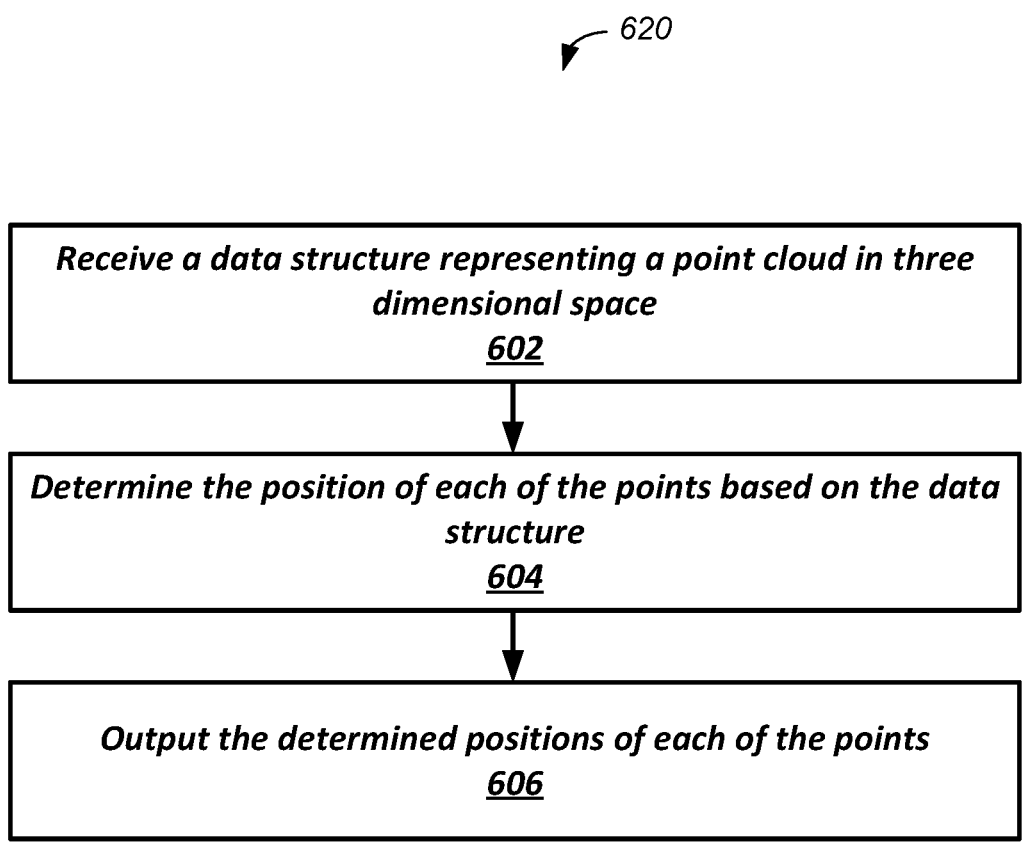
FIG. 6B illustrates an example process of rendering three-dimensional content based on a data structure representing a point cloud.

FIG. 6B shows an example process 620 for rendering three-dimensional content based on a data structure representing a point cloud. The process 620 can be performed, at least in part, using one or more devices (e.g., one or more of the computer systems shown in FIG. 10).

According to the process 620, a computer system receives a data structure representing a point cloud in three-dimensional space (block 622). The point cloud has a plurality of points. The data structure includes, for each point, a sequence of bits encoding a position of the point in each dimension of the three-dimensional space, where the position of the point is encoded according to a tree data structure. For a subset of the points, the corresponding sequences of bits are quantized according to a first quantization step size. For a remainder of the points, the corresponding sequences of bits are quantized according to a second quantization step size, where the first quantization step size is different from the second quantization step size. The subset of the points are spatially isolated from a remainder of the points. In some implementations, the tree data structure can be an octree.

The computer system determines the position of each of the points based on the data structure (block 624). In some implementations, this can include retrieving an indication of the first quantization step size from a header in the data structure, and determining the position of each of the points of the subset of points based on the first quantization step size.

The computer system outputs the determined positions of each of the points (block 626).

In some implementations, the computer system can also render three-dimensional content based on the determined positions of each of the points. The three-dimensional content can be at least one of virtual reality content or augmented reality content.

Figure 7A:
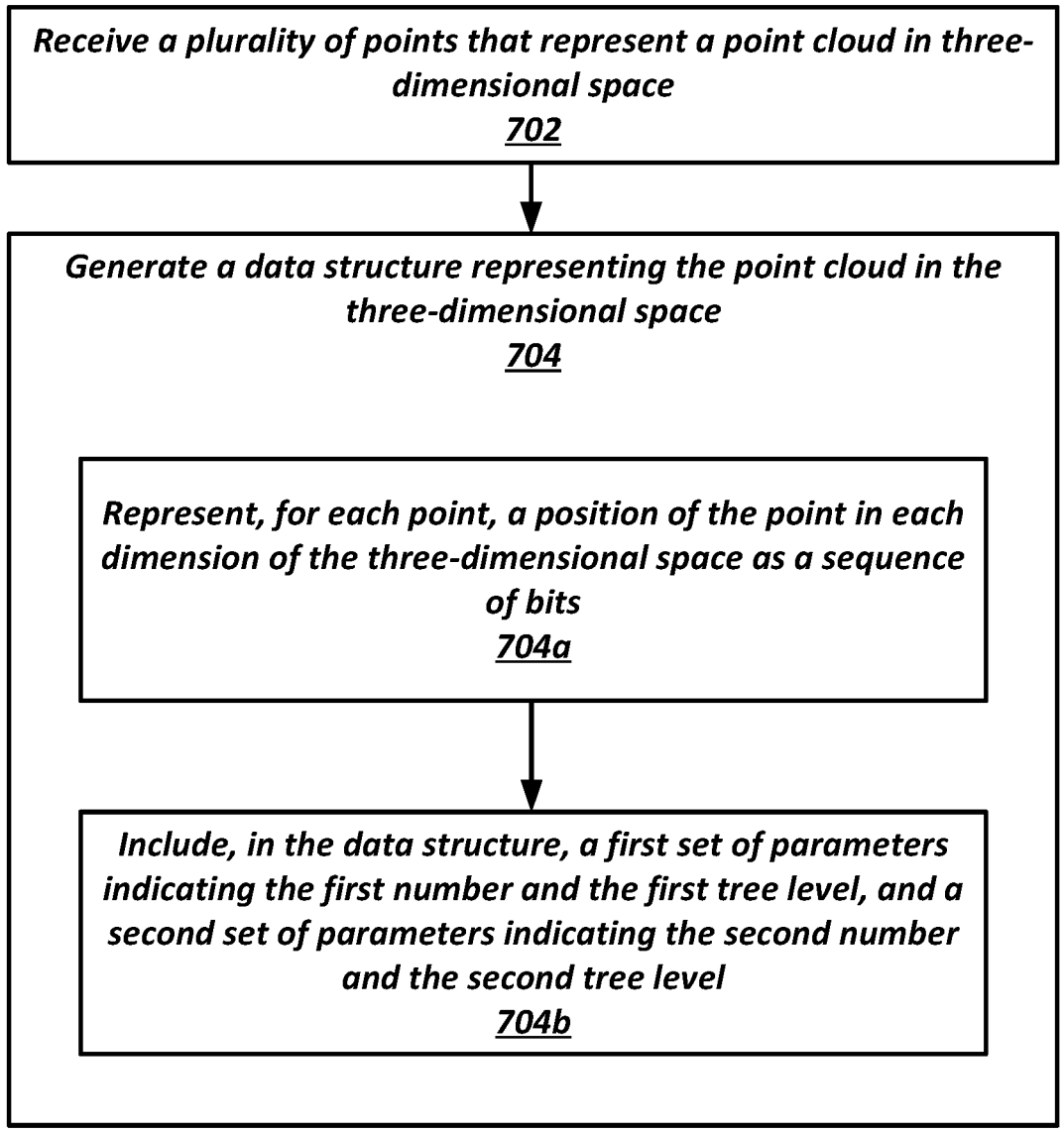
FIG. 7A illustrates an example process of generating a data structure representing a point cloud.

FIG. 7A shows an example process 700 for generating a data structure representing a point cloud in three-dimensional space. The process 700 can be performed, at least in part, using one or more devices (e.g., one or more of the computer systems shown in FIG. 10).

According to the process 700, a computer system receives a plurality of points that represent a point cloud in three-dimensional space (block 702).

The system generates a data structure representing the point cloud in the three-dimensional space (block 704).

Generating the data structure includes representing, for each point, a position of the point in each dimension of the three-dimensional space as a sequence of bits (block 704*a*). The position of the point is represented according to a tree data structure. The tree data structure includes a plurality of tree levels, each having a plurality of nodes. Each node of a first tree level has a first number of corresponding child nodes in a second tree level. Each node of the second tree level has a second number of corresponding child nodes in a third tree level, where the first number is different from the second number. In some implementations, the first number is a cube of an integer, and the second number is not a cube of an integer.

Generating the data structure can includes including, in the data structure, a first set of parameters indicating the first number and the first tree level, and a second set of parameters indicating the second number and the second tree level (block 704*b*).

In some implementations, the process can include determining, each of the nodes of the third tree level, an occupancy of adjacent nodes of the third tree level; performing, each of the nodes, one or more data processing steps based on the determined occupancy of the adjacent nodes of the third tree level; and subsequent to performing the one or more data processing steps, performing one or more quantization or scaling steps with respect to the data structure.

In some implementations, performing the one or more quantization or scaling steps with respect to the data structure can include partitioning each of the sequences of bits into two or more portions of bits according to a scaling depth of the tree data structure.

In some implementations, performing one or more quantization or scaling steps with respect to the data structure further can include quantizing at least some of the portions of bits according to a quantization step size; and including the quantized portions of bits in the data structure.

Figure 7B:
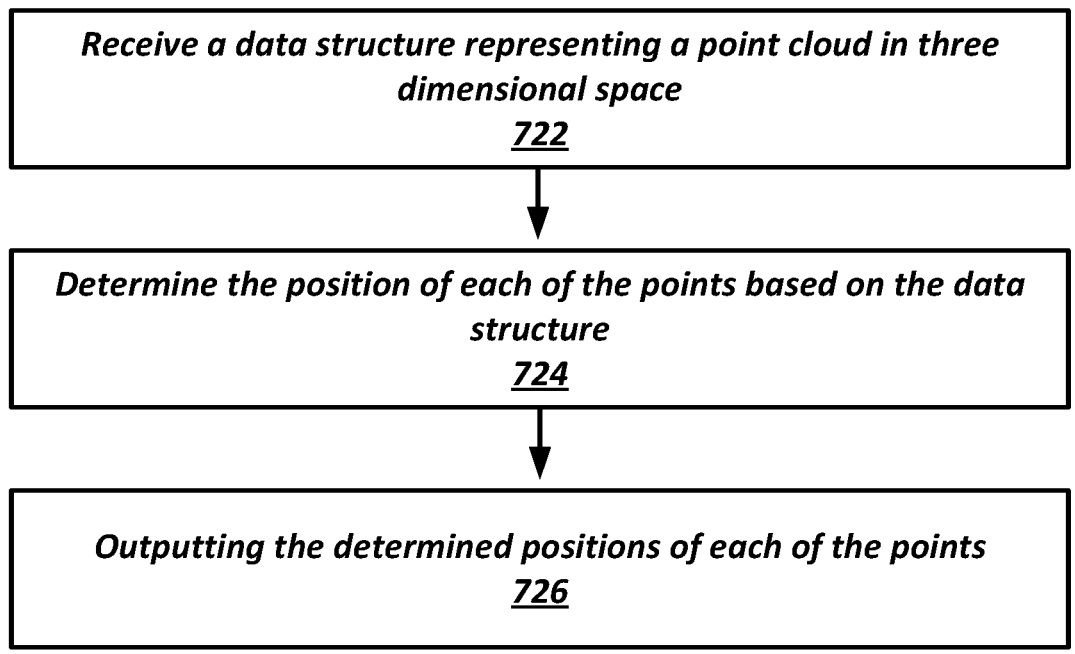
FIG. 7B illustrates an example process of rendering three-dimensional content based on a data structure representing a point cloud.

FIG. 7B shows an example process 720 for rendering three-dimensional content based on a data structure representing a point cloud. The process 720 can be performed, at least in part, using one or more devices (e.g., one or more of the computer systems shown in FIG. 10).

According to the process 720, a computer system receives a data structure representing a point cloud in three-dimensional space (block 722). The point cloud has a plurality of points. The data structure indicates, for each of the points, a position of a point encoded according to a tree data structure. The tree data structure includes a plurality of tree levels, each having a plurality of nodes. Each node of a first tree level has a first number of corresponding child nodes in a second tree level, and each node of the second tree level has a second number of corresponding child nodes in a third tree level, wherein the first number is different from the second number. The data structure includes a first set of parameters indicating the first number and the first tree level, and a second set of parameters indicating the second number and the second tree level. In some implementations, the first number is a cube of an integer, and the second number is not a cube of an integer. In some implementations, the tree data structure can be an octree.

The computer system determines the position of each of the points based on the data structure (block 724). This can include retrieving, from the data structure, the first set of parameters and the second set of parameters, and determining, based on the first set of parameters and the second set of parameters, that each node of the first tree level has the first number of corresponding child nodes in the second tree level, and that each node of the second tree level has the second number of corresponding child nodes in the third tree level.

The computer system outputs the determined positions of each of the points (block 726).

In some implantations, the computer system can also render three-dimensional content based on the determined positions of each of the points. The three-dimensional content can be at least one of virtual reality content or augmented reality content.

Figure 8:
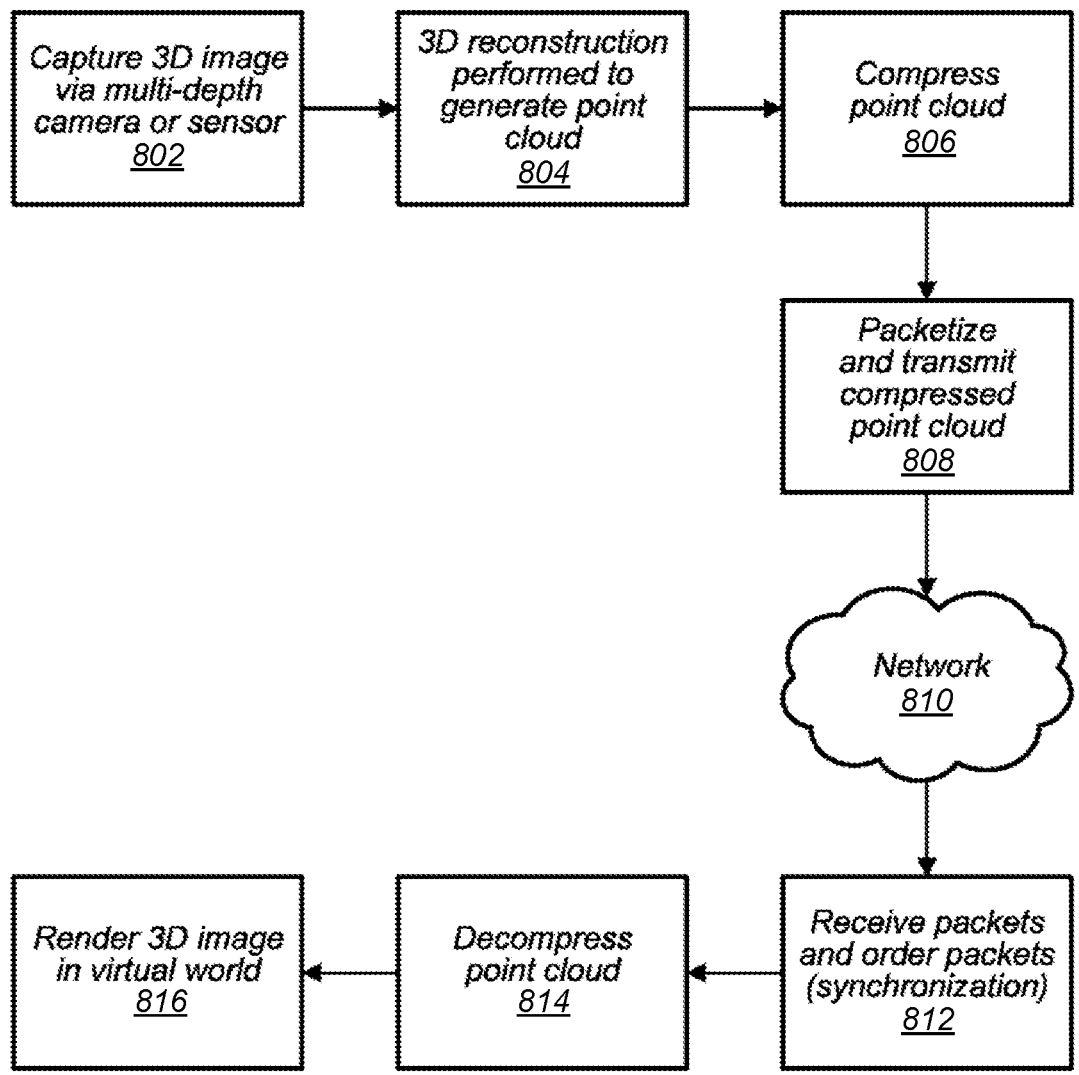
FIG. 8 illustrates compressed point cloud information being used in a 3-D application.

FIG. 8 illustrates compressed point clouds being used in a 3-D application.

In some embodiments, a sensor, such as sensor 102, an encoder, such as encoder 104, and a decoder, such as decoder 116, may be used to communicate point clouds in a 3-D application. For example, a sensor, such as sensor 102, at block 802 may capture a 3D image and at block 804, the sensor or a processor associated with the sensor may perform a 3D reconstruction based on sensed data to generate a point cloud.

At block 806, an encoder such as encoder 104 may compress the point cloud and at block 808 the encoder or a post processor may packetize and transmit the compressed point cloud, via a network 810. At block 812, the packets may be received at a destination location that includes a decoder, such as decoder 116. The decoder may decompress the point cloud at block 814 and the decompressed point cloud may be rendered at block 816. In some embodiments a 3-D application may transmit point cloud data in real time such that a display at block 816 represents images being observed at block 802. For example, a camera in a canyon may allow a remote user to experience walking through a virtual canyon at block 816.

Figure 9:
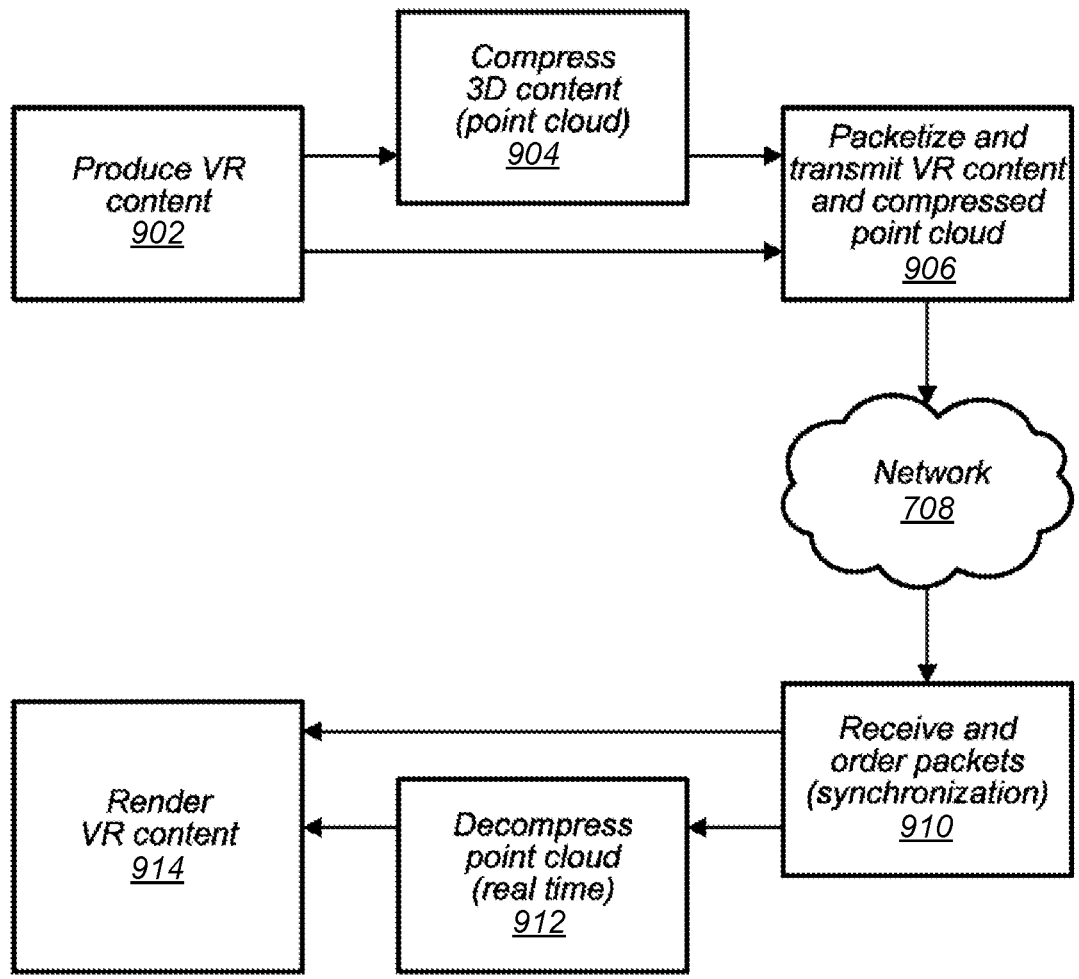
FIG. 9 illustrates compressed point cloud information being used in a virtual reality application, according to some embodiments.

FIG. 9 illustrates compressed point clouds being used in a virtual reality (VR) or augmented reality (AR) application.

In some embodiments, point clouds may be generated in software (for example as opposed to being captured by a sensor). For example, at block 902 virtual reality or augmented reality content is produced. The virtual reality or augmented reality content may include point cloud data and non-point cloud data. For example, a non-point cloud character may traverse a landscape represented by point clouds, as one example. At 904, the point cloud data may be compressed and at block 906 the compressed point cloud data and non-point cloud data may be packetized and transmitted via a network 908. For example, the virtual reality or augmented reality content produced at block 902 may be produced at a remote server and communicated to a VR or AR content consumer via network 908. At block 910, the packets may be received and synchronized at the VR or AR consumer's device. A decoder operating at the VR or AR consumer's device may decompress the compressed point cloud at block 912 and the point cloud and non-point cloud data may be rendered in real time, for example in a head mounted display of the VR or AR consumer's device. In some embodiments, point cloud data may be generated, compressed, decompressed, and rendered responsive to the VR or AR consumer manipulating the head mounted display to look in different directions.

In some embodiments, point cloud compression as described herein may be used in various other applications, such as geographic information systems, sports replay broadcasting, museum displays, autonomous navigation, etc.

Example Computer System

Figure 10:
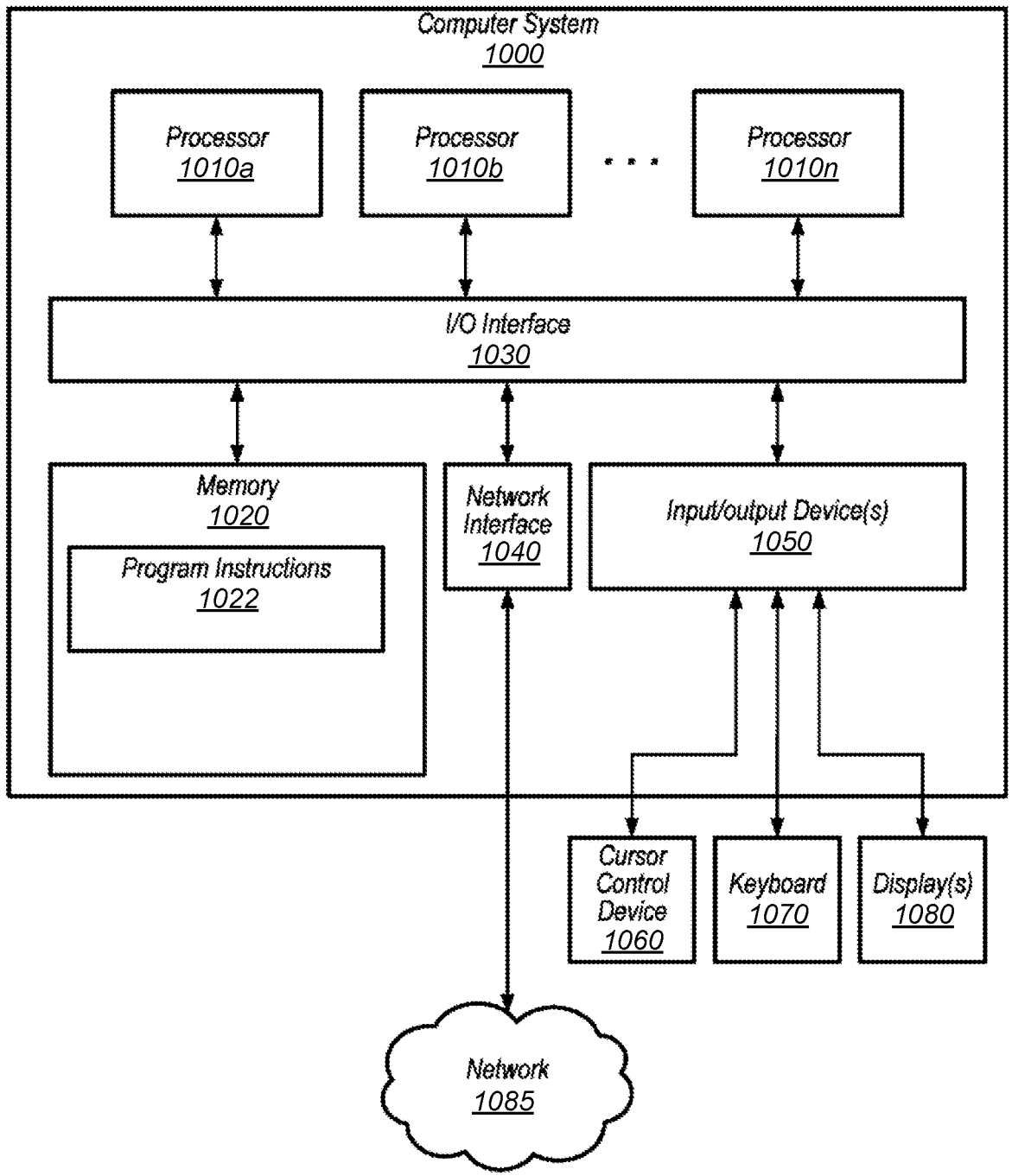
FIG. 10 illustrates an example computer system that may implement an encoder or decoder.

FIG. 10 illustrates an example computer system 1000 that may implement an encoder or decoder or any other ones of the components described herein, (e.g., any of the components described above with reference to FIGS. 1-9). The computer system 1000 may be configured to execute any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 1000, which may interact with various other devices. Note that any component, action, or functionality described above with respect to FIGS. 1-9 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store point cloud compression or point cloud decompression program instructions 1022 and/or sensor data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1022 may be configured to implement an image sensor control application incorporating any of the functionality described above. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., carrier or agent devices) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1022, which may be processor-executable to implement any element or action described above. In one embodiment, the program instructions may implement the methods described above. In other embodiments, different elements and data may be included. Note that data may include any data or information described above.

Those skilled in the art will appreciate that computer system 1000 is merely illustrative and is not intended to limit the scope of embodiments. In particular, the computer system and devices may include any combination of hardware and software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:
1. A method comprising:
   receiving, by a computer system, a data structure representing a point cloud in three-dimensional space, the point cloud having a plurality of points, wherein the data structure comprises, for each point, a sequence of bits encoding a position of the point in each dimension of the three-dimensional space, wherein the position of the point is encoded according to a tree data structure representing a plurality of octants of space, wherein, for a subset of the points, the corresponding sequences of bits represent an explicit signaling of the positions of the subset of the points relative to one or more reference points in the tree data structure according to a direct coding mode, and are quantized according to a first quantization step size, wherein, for a remainder of the points, the corresponding sequences of bits represent the positions of the remainder of the points according to the tree data structure and without the direct coding mode, and are quantized according to a second quantization step size, wherein the first quantization step size is different from the second quantization step size, wherein the subset of the points occupy one or more first octants of space of the plurality of octants of space, and wherein each of the one or more first octants of space are surrounded by respective unoccupied octants of space of the plurality of octants of space, determining, by the computer system, the position of each of the points based on the data structure, wherein determining the position of each of the points comprises:

for a subset of the points:
decoding the corresponding sequence of bits according to the direct coding mode to determine first position information representing the positions of the subset of the points relative to the one or more reference points, and
scaling the first position information by the first quantization step size, and for the remainder of the points:
decoding the corresponding sequence of bits to determine second position information representing the positions of the remaining of the points according to the tree data structure, and
dequantizing the second position information according to the second quantization step size; and outputting, by the computer system, the determined positions of each of the points.

2. The method of claim 1, wherein determining the position of each of the points based on the data structure comprises retrieving an indication of the first quantization step size from a header in the data structure, and
determining the position of each of the points of the subset of points based on the first quantization step size.

3. The method of claim 1, wherein the tree data structure is an octree.

4. The method of claim 1, further comprising rendering three-dimensional content based on the determined positions of each of the points, wherein the three-dimensional content is at least one of virtual reality content or augmented reality content.

5. A device comprising:
one or more processors; and
memory storing instructions that when executed by the one or more processors, cause the one or more processors to perform operations comprising:
receiving a data structure representing a point cloud in three-dimensional space, the point cloud having a plurality of points, wherein the data structure comprises, for each point, a sequence of bits encoding a position of the point in each dimension of the three-dimensional space, wherein the position of the point is encoded according to a tree data structure representing a plurality of octants of space, wherein, for a subset of the points, the corresponding sequences of bits represent an explicit signaling of the positions of the subset of the points relative to one or more reference points in the tree data structure according to a direct coding mode, and are quantized according to a first quantization step size, wherein, for a remainder of the points, the corresponding sequences of bits represent the positions of the remainder of the points according to the tree data structure and without the direct coding mode, and are quantized according to a second quantization step size, wherein the first quantization step size is different from the second quantization step size, wherein the subset of the points occupy one or more first octants of space of the plurality of octants of space, and wherein each of the one or more first octants of space are surrounded by respective unoccupied octants of space of the plurality of octants of space, determining the position of each of the points based on the data structure, wherein determining the position of each of the points comprises:

for a subset of the points:
decoding the corresponding sequence of bits according to the direct coding mode to determine first position information representing the positions of the subset of the points relative to the one or more reference points, and
scaling the first position information by the first quantization step size, and for the remainder of the points:
decoding the corresponding sequence of bits to determine second position information representing the positions of the remaining of the points according to the tree data structure, and
dequantizing the second position information according to the second quantization step; and outputting the determined positions of each of the points.

6. The device of claim 5, wherein determining the position of each of the points based on the data structure comprises retrieving an indication of the first quantization step size from a header in the data structure, and
determining the position of each of the points of the subset of points based on the first quantization step size.

7. The device of claim 5, wherein the tree data structure is an octree.

8. The device of claim 5, the operations further comprising rendering three-dimensional content based on the determined positions of each of the points, wherein the three-dimensional content is at least one of virtual reality content or augmented reality content.

9. A non-transitory, computer-readable storage medium having instructions stored thereon, that when executed by one or more processors, cause the one or more processors to perform operations comprising:
receiving a data structure representing a point cloud in three-dimensional space, the point cloud having a plurality of points,
wherein the data structure comprises, for each point, a sequence of bits encoding a position of the point in each dimension of the three-dimensional space, wherein the position of the point is encoded according to a tree data structure representing a plurality of octants of space, wherein, for a subset of the points, the corresponding sequences of bits represent an explicit signaling of the positions of the subset of the points relative to one or more reference points in the tree data structure according to a direct coding mode, and are quantized according to a first quantization step size, wherein, for a remainder of the points, the corresponding sequences of bits represent the positions of the remainder of the points according to the tree data structure and without the direct coding mode, and are quantized according to a second quantization step size, wherein the first quantization step size is different from the second quantization step size, wherein the subset of the points occupy one or more first octants of space of the plurality of octants of space, and wherein each of the one or more first octants of space are surrounded by respective unoccupied octants of space of the plurality of octants of space, determining the position of each of the points based on the data structure, wherein determining the position of each of the points comprises:

for a subset of the points:

decoding the corresponding sequence of bits according to the direct coding mode to determine first position information representing the positions of the subset of the points relative to the one or more reference points, and scaling the first position information by the first quantization step size, and for the remainder of the points:

decoding the corresponding sequence of bits to determine second position information representing the positions of the remaining of the points according to the tree data structure, and dequantizing the second position information according to the second quantization step; and outputting the determined positions of each of the points.

10. The non-transitory, computer-readable storage medium of claim 9, wherein determining the position of each of the points based on the data structure comprises retrieving an indication of the first quantization step size from a header in the data structure, and determining the position of each of the points of the subset of points based on the first quantization step size.

11. The non-transitory, computer-readable storage medium of claim 9, wherein the tree data structure is an octree.

12. The non-transitory, computer-readable storage medium of claim 9, the operations further comprising rendering three-dimensional content based on the determined positions of each of the points, wherein the three-dimensional content is at least one of virtual reality content or augmented reality content.

* * * * *